(12) United States Patent
Cooper

(10) Patent No.: US 8,544,874 B2
(45) Date of Patent: Oct. 1, 2013

(54) TRANSPORT DEVICE FRAME ASSEMBLY

(76) Inventor: Dale Cooper, American Falls, ID (US)

( * ) Notice: Subject to any disclaimer, the term of this patent is extended or adjusted under 35 U.S.C. 154(b) by 0 days.

(21) Appl. No.: 13/528,979

(22) Filed: Jun. 21, 2012

(65) Prior Publication Data

US 2013/0147164 A1    Jun. 13, 2013

Related U.S. Application Data

(63) Continuation of application No. 13/420,396, filed on Mar. 14, 2012, which is a continuation of application No. 13/314,345, filed on Dec. 8, 2011, now abandoned.

(51) Int. Cl.
B63B 1/12 (2006.01)

(52) U.S. Cl.
USPC ........ 280/659; 280/63; 280/47.26; 280/47.18

(58) Field of Classification Search
USPC ........ 280/47.18, 47.26, 47.31, 79.5; 414/498
See application file for complete search history.

(56) References Cited

U.S. PATENT DOCUMENTS

| | | | |
|---|---|---|---|
| 957,840 A | 5/1910 | Bjorklund | |
| 1,319,530 A | 10/1919 | Nies et al. | |
| 1,475,785 A | 11/1923 | Bergstrom | |
| 2,532,015 A | 11/1950 | De Lay | |
| 2,579,077 A * | 12/1951 | Hubner | 280/47.18 |
| 2,589,325 A * | 3/1952 | Bachman | 280/47.18 |
| D175,069 S | 7/1955 | Gandola | |
| 2,797,125 A | 6/1957 | Vogler | |
| 2,973,884 A | 3/1961 | West et al. | |
| 2,992,011 A | 7/1961 | Becan | |
| D199,053 S | 9/1964 | Brighton | |
| D201,547 S | 7/1965 | Krueger, Jr. | |
| 3,262,713 A | 7/1966 | Crawford, Sr. | |
| 3,350,797 A | 11/1967 | Dassinger | |
| 3,418,005 A | 12/1968 | Allina | |
| D222,243 S | 10/1971 | Young | |
| 3,751,058 A | 8/1973 | Larsen | |
| 3,774,930 A | 11/1973 | Pravednekow | |
| 3,875,981 A | 4/1975 | Brenner et al. | |
| 3,888,501 A | 6/1975 | McChesney | |
| 3,977,477 A * | 8/1976 | Wise | 172/246 |
| 4,261,596 A | 4/1981 | Douglas | |
| D261,125 S | 10/1981 | Gordon et al. | |
| 4,341,393 A * | 7/1982 | Gordon et al. | 280/47.26 |
| 4,350,356 A * | 9/1982 | Crothers | 280/47.26 |
| 4,362,309 A * | 12/1982 | Stamper | 280/47.19 |
| 4,417,765 A * | 11/1983 | Wirsbinski | 298/5 |
| 4,471,996 A * | 9/1984 | Primeau | 298/3 |
| 4,570,961 A | 2/1986 | Chateauneuf et al. | |
| 4,629,203 A * | 12/1986 | Ballard | 280/47.26 |
| 4,740,008 A * | 4/1988 | Johnson | 280/475 |
| 4,789,171 A * | 12/1988 | Porter | 280/47.18 |
| 4,790,549 A * | 12/1988 | Armand | 280/47.18 |
| 4,811,968 A * | 3/1989 | Bolden | 280/652 |

(Continued)

*Primary Examiner* — Jeffrey J Restifo
(74) *Attorney, Agent, or Firm* — Jones Waldo Holbrook & McDonough, P.C.

(57) ABSTRACT

A transport device cart having a frame assembly having one or more arms corresponding to and capable of engaging a removable bucket; one or more movement mechanisms; and a latching post. It also includes a latching assembly rotatably coupled to the frame assembly having a hooking latch capable of engaging and disengaging the latching post. A handle assembly is coupled to the latching assembly, wherein the handle assembly can be rotated back and used to push the removable bucket into a substantially inverted position.

15 Claims, 34 Drawing Sheets

(56) References Cited

U.S. PATENT DOCUMENTS

| | | | |
|---|---|---|---|
| 4,861,110 A * | 8/1989 | Rumpke | 298/2 |
| 4,889,360 A * | 12/1989 | Havlovitz | 280/655.1 |
| 5,017,080 A | 5/1991 | Thorndike et al. | |
| D361,191 S | 8/1995 | Kowalski et al. | |
| 5,445,397 A | 8/1995 | Evans | |
| D370,326 S | 5/1996 | Chapman et al. | |
| 5,692,761 A | 12/1997 | Havlovitz | |
| 5,893,572 A | 4/1999 | Parks | |
| 5,906,381 A | 5/1999 | Hovatter | |
| 5,915,706 A * | 6/1999 | Mosley | 280/47.26 |
| 6,050,576 A * | 4/2000 | Tanner et al. | 280/47.21 |
| 6,161,851 A * | 12/2000 | Garner, Jr. | 280/47.29 |
| 6,186,523 B1 * | 2/2001 | Aielli | 280/47.31 |
| 6,193,319 B1 * | 2/2001 | Kielinski | 298/2 |
| D456,971 S | 5/2002 | Abel | |
| 6,390,495 B1 | 5/2002 | Cates | |
| 6,390,496 B1 * | 5/2002 | Eicher | 280/653 |
| 6,523,839 B2 * | 2/2003 | Simmons et al. | 280/47.34 |
| 6,715,775 B2 * | 4/2004 | Abel | 280/47.31 |
| 6,758,482 B2 | 7/2004 | Stallbaumer | |
| 6,880,835 B2 | 4/2005 | Tornabene et al. | |
| 6,886,838 B1 * | 5/2005 | Zimmerman | 280/47.31 |
| 6,945,545 B2 | 9/2005 | Celli | |
| 7,168,712 B2 | 1/2007 | Celli | |
| D544,173 S | 6/2007 | Mullen et al. | |
| 7,392,994 B2 * | 7/2008 | Darling, III | 280/47.18 |
| D606,565 S | 12/2009 | Hickenbottom | |
| 7,775,531 B2 * | 8/2010 | Zimmerman | 280/47.31 |
| 7,823,906 B2 | 11/2010 | Darling, III | |
| 8,061,722 B2 * | 11/2011 | Price et al. | 280/47.18 |
| 2003/0062699 A1 * | 4/2003 | Gargaro | 280/47.18 |
| 2010/0013179 A1 | 1/2010 | Zhijun | |

\* cited by examiner

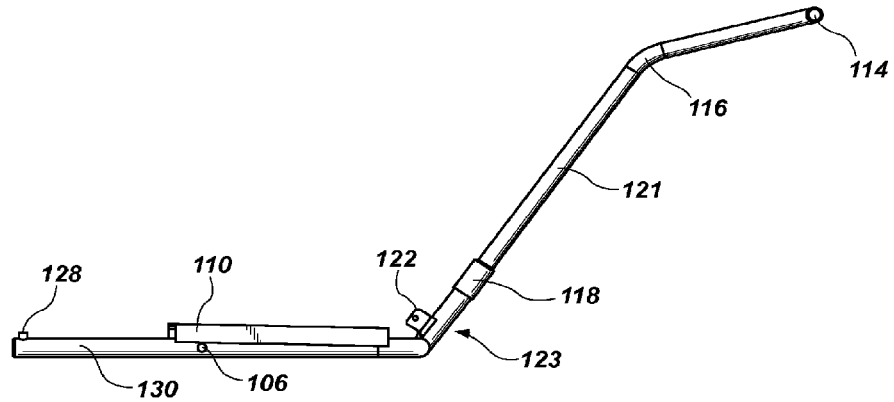
FIG. 5
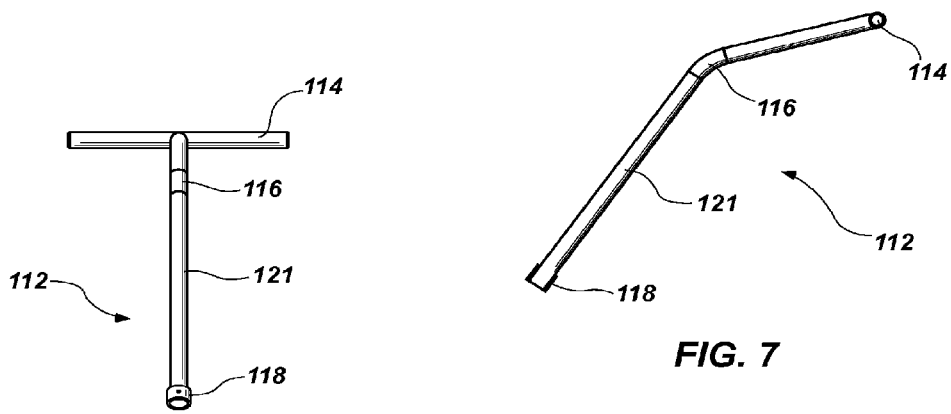
FIG. 6
FIG. 7
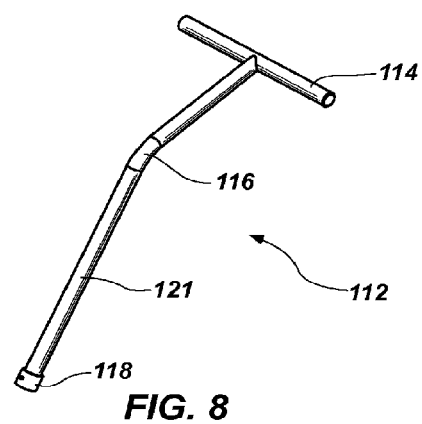
FIG. 8

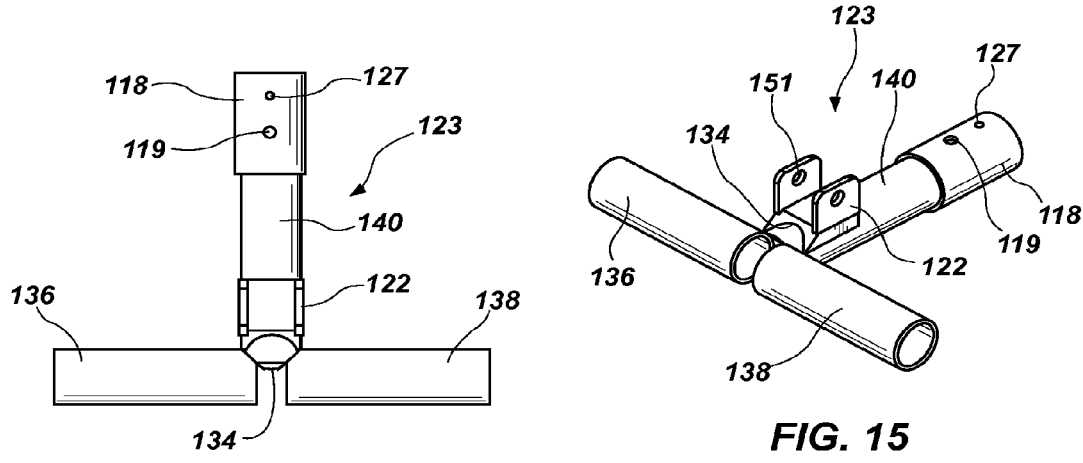
FIG. 13    FIG. 15
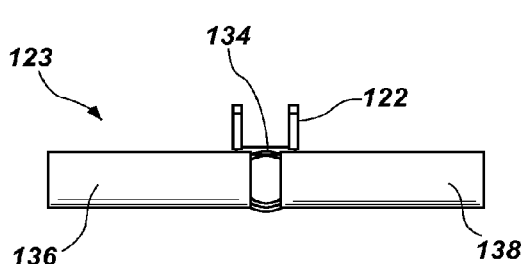 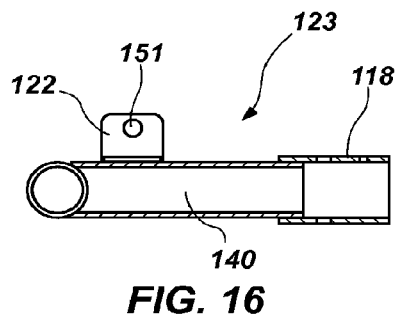
FIG. 14    FIG. 16
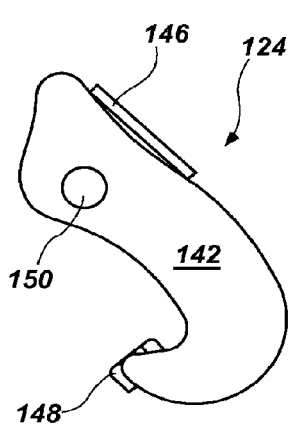 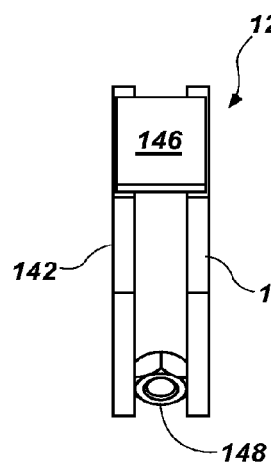 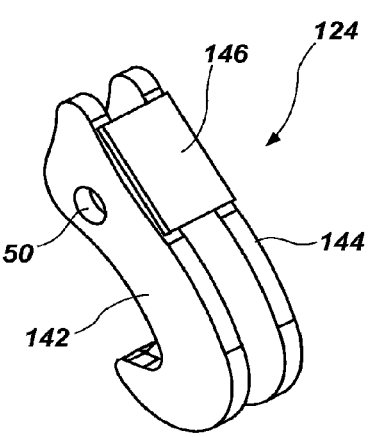
FIG. 17    FIG. 18    FIG. 19

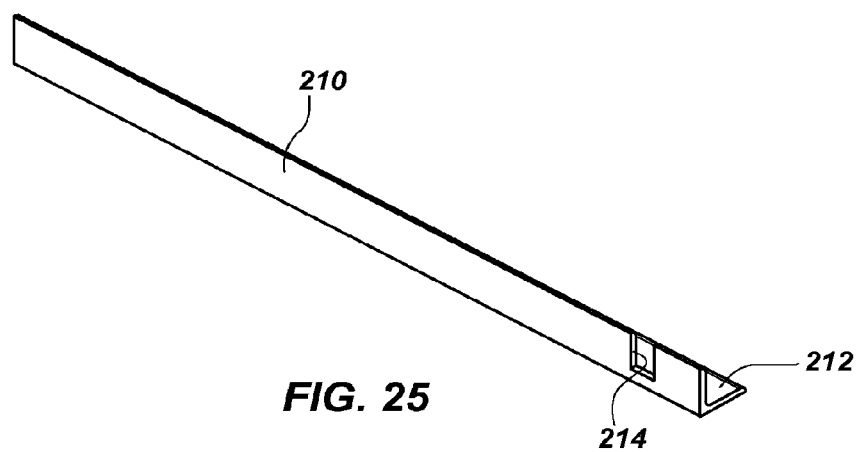
FIG. 25
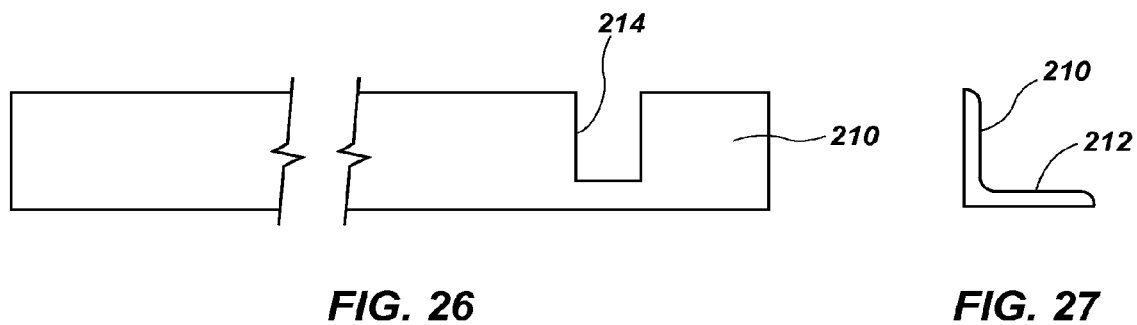
FIG. 26  FIG. 27

TRANSPORT DEVICE FRAME ASSEMBLY

PRIORITY

This application is a continuation in part of application Ser. No. 13/420,396 filed Mar. 14, 2012, which is a continuation in part of Ser. No. 13/314,345, filed Dec. 8, 2011 and claims priority to the same.

BACKGROUND

Wheel barrows and other similar devices are used in a wide variety of industries to transport countless materials and items from one location to another. Traditional wheel barrows are typically characterized by a large drum or tub having a single wheel near the nose and two legs near the rear of the tub. Two elongated handles extend from the tub and are grasped by the user to raise the barrow off the legs and thereby place the weight of the contents on the front wheel for transport.

Wheel barrows and other similar devices have several flaws that make them poorly suited for many commercial and domestic applications—including, but not limited to, farming, landscaping, construction and manufacturing. For example, wheel barrows are poorly balanced and tend to tip over when being moved—especially if the tubs are filled or heavily laden. Additionally, because of their shape, existing transport devices are difficult to store—especially in volume—when not in use. They are generally not capable of being stacked one on another. Nor are they generally well-suited for large-volume lateral placement. Moreover, because of their bulkiness, existing transport devices cannot be easily hauled from location to location without a large truck bed or similar hauling space. Transporting such a device in the trunk space of an ordinary vehicle—if it can be fit in at all—prevents the trunk from being completely closed and requires substantial tying down to keep the device from falling out en route, thus putting the device at risk as well as creating danger for others on the road. Additionally, existing transport devices are typically static in their height and cannot be customized to accommodate the size of the person lifting the load.

The present invention in its various embodiments is a transport device that has a removable bucket or tub. It is well-balanced and has a comparatively small storage footprint. It can be adapted to a wide variety of uses and applications and is particularly useful in farming.

The present invention in its various embodiments can be easily emptied and has high maneuverability. The device can, in certain embodiments, be consolidated into a relatively small unit that is easily hauled from location to location and can even fit into the trunk of an ordinary vehicle. The device can also include an adjustable handle that allows it to be customized to accommodate the size of the person lifting the load. The present invention in certain embodiments is also advantageous in that the size of the wheels allows it to be maneuvered up and down stairs.

The foregoing advantages as well as others are provided for by the invention in its various embodiments.

SUMMARY

The invention in its various embodiments includes the following features. It is a transport device cart having a frame assembly having one or more arms corresponding to and capable of engaging a removable bucket; one or more movement mechanisms; and a latching post. It also includes a latching assembly rotatably coupled to the frame assembly having a hooking latch capable of engaging and disengaging the latching post. A handle assembly is coupled to the latching assembly, wherein the handle assembly can be rotated back and used to push the removable bucket into a substantially inverted position.

The latch assembly can include two base pieces connected at substantially 90 degree angles to a connection piece. It can further include a u-shaped fastener secured to the connection piece. A hook latch can then be rotatably coupled to the fastener. In one embodiment, the hook latch is two or more hook pieces connected substantially parallel to one another and separated by a spacer. This hook latch can include a threaded receptacle between the hook pieces. The hook latch can also be a substantially single piece.

In certain embodiments, the handle assembly is removable. The handle assemble can include a locking pivot mechanism. The handle assembly and the latch assembly can be coupled at a sleeve thereby allowing the handle assembly to pivot in a variety of orientations such that the transport device cart can be easily moved in a relatively small space. The hook latch in certain embodiments is capable of disengaging the latching post when the bucket is being emptied such that the bucket can be tipped until substantially upside down.

The transport device cart can further include a kickstand. The kickstand can include a pedal. In certain embodiments, the kickstand is coupled to the frame assembly with one or more sleeves. The kickstand can further include a stopping mechanism that prevents the kickstand from motion beyond a predetermined point. It can also include a spring rod mechanism.

BRIEF DESCRIPTION OF THE DRAWINGS

FIG. 5 shows a side view of the partial frame, latch and handle assembly depicted in FIG. 3.

FIG. 6 shows a front view of a handle assembly according to one embodiment of the present invention.

FIG. 7 shows a side view of the handle assembly of FIG. 6.

FIG. 8 shows a front elevation view of the handle assembly of FIG. 6.

FIG. 13 shows a front view of a partial latch assembly according to one embodiment of the present invention.

FIG. 14 shows a bottom view of the partial latch assembly of FIG. 13.

FIG. 15 shows a front elevation view of the partial latch assembly of FIG. 13.

FIG. 16 shows a side view of the partial latch assembly of FIG. 13.

FIG. 17 shows a side view of a hook latch according to one embodiment of the present invention.

FIG. 18 shows a front view of the hook latch of FIG. 17.

FIG. 19 shows a front elevation view of the hook latch of FIG. 17.

FIG. 25 is a front elevation view of a bucket track piece according to one embodiment of the present invention.

FIG. 26 is a broken side view of the track piece of FIG. 25.

FIG. 27 is a front view of the track piece of FIG. 25.

DETAILED DESCRIPTION OF THE ILLUSTRATED INVENTION

Figure 1:
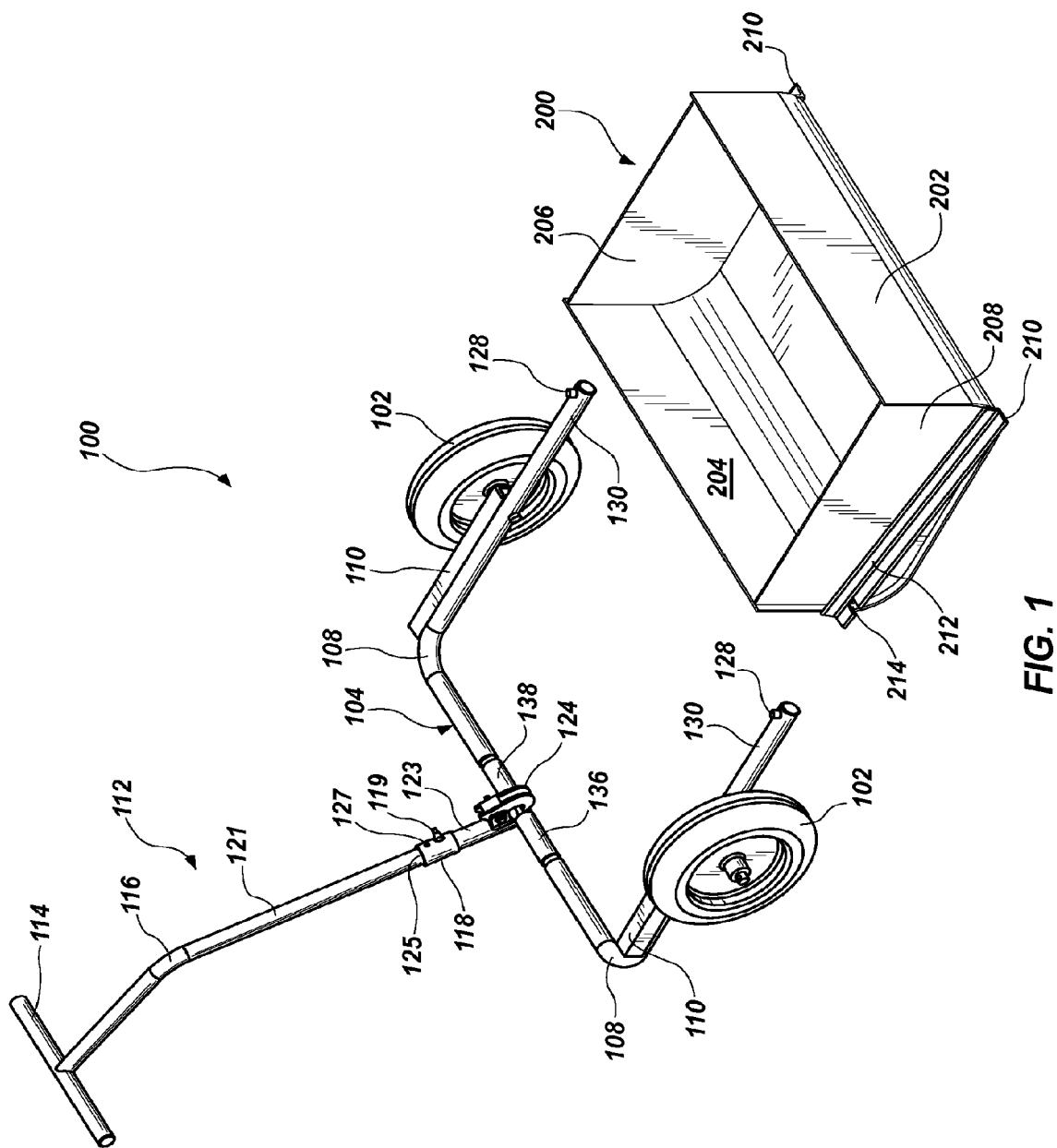
FIG. 1 shows a front elevation view of a transport device with the bucket removed according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Referring now to FIGS. 1-5 and 9-12, the present invention in its various embodiments is a transport device 100. The transport device 100 includes a frame 104. The frame 104 can include one or more wheels 102 rotatably connected to axes 106. In the present embodiments, there is one wheel 102 on each side. However, in certain embodiments, it may be desirable to include multiple wheels on each side. In yet other embodiments, other rolling mechanisms that would be apparent to one skilled in the art could be utilized including, but not limited to tracks.

Suitable wheels for use with the present invention include, but are not limited to, 13 inch wheels with 0.625 inch hubs available from Marathon Industries, Inc. (Kent, Wash.).

In the present embodiments, the frame 104 is stainless steel tubing, but in other embodiments the frame could be numerous other materials that would be apparent to one skilled in the art including but not limited to iron; aluminum; combinations and alloys thereof; wood; plastics; and fiberglass and combinations thereof. It is also noted that the frame in this or other embodiments need not necessarily be tubing. This provides lighter weight and strength, but in certain embodiments, it may be desirable to have the frame made of a solid material.

In other embodiments, it may be advantageous to have the frame, or portions thereof, have different cross-sectional shapes (other than substantially circular). Frame 104 is bent to substantially 90 degree angles at corners 108. This could be accomplished with 90 degree joints or bending a single piece.

Frame 104 includes at least two arms 130 that, as described further below, engage the bucket 200 at track 210. Near the ends of the arms 130, catchers 128 can be included. As is discussed further below, the catchers 128 can be used to pull the bucket 200—especially when full—to a more accessible location for loading onto the frame 104. The frame 104 can also include guide pieces 110 that help direct the placement of the bucket 200 and help secure bucket track 210 to arms 130 when in use—particularly when dumping. In certain embodiments, it may be advantageous to secure the guide pieces 110 to the bucket 200 rather than to the frame. In yet other embodiments, it may be advantageous to remove the guide pieces 110 altogether. The guide pieces 110 can be made of numerous materials that would be apparent to one skilled in the art including, but not limited to, steel, iron, aluminum and combinations and alloys thereof.

The transport device 100 also includes a handle assembly 112. Referring more particularly to FIGS. 6-8, the handle assembly 112 in the present embodiments is stainless steel tubing, but in other embodiments, the handle assembly could be numerous other materials that would be apparent to one skilled in the art including but not limited to iron; aluminum; combinations and alloys thereof; wood; plastics; and fiberglass and combinations thereof. Again, as noted in connection with the frame, the handle assembly need not necessarily be tubing. While such a configuration provides lighter weight and strength, in certain embodiments, it may be desirable to have the handle assembly made of a solid material. In other embodiments, it may be advantageous to have the assembly, or portions thereof, have different cross-sectional shapes (other than substantially circular).

Figure 38:
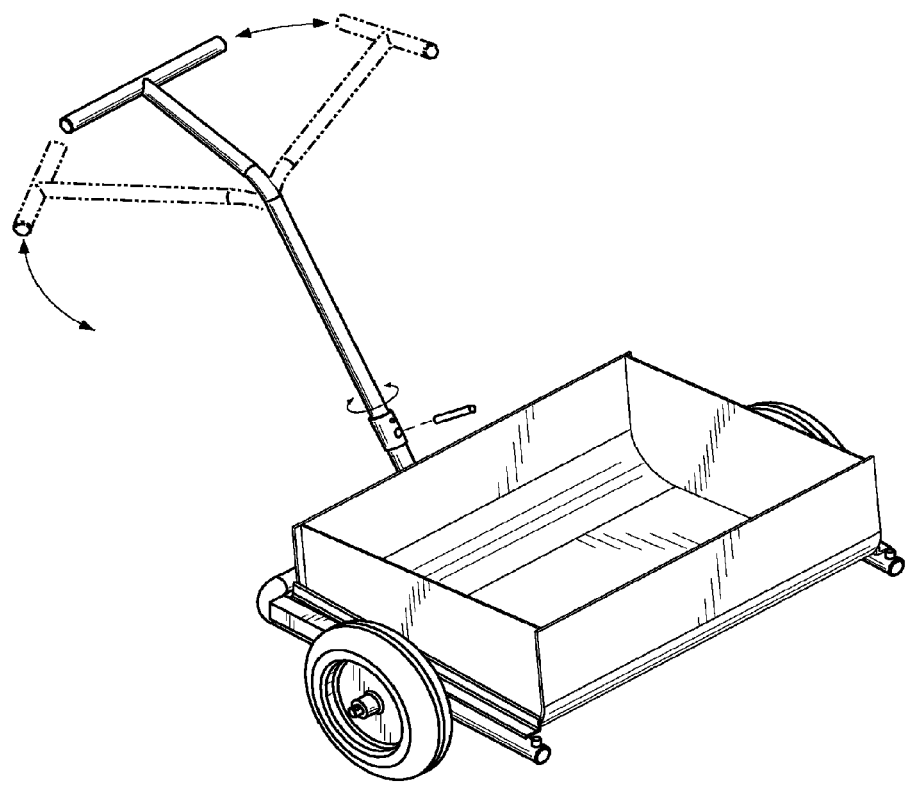
FIG. 38 is a front elevation view of a transport device depicting the rotational movement of the handle assembly according to one embodiment of the present invention.

Handle assembly 112 can include a handle portion 114 which in the present embodiments is a T-shape that can be equipped with grips or other similar mechanisms to improve grip and/or comfort. Handle assembly 112 can include a bend 116 and extension 121. The bend 116 and extension 121 helps the user provide more leverage in driving the device 100 forward, as well as tipping to engage and unload the bucket 200. It also provides greater comfort and control in turning—especially in embodiments having a rotating handle assembly (FIG. 38).

The transport device 100 also includes a latching assembly. Referring now more particularly to FIGS. 13-21, latch assembly 123 can include two base pieces 136, 138—which in this embodiment are stainless steel tubing—connected at substantially 90 degree angles to a connection piece 140. In this embodiment, the base pieces 136, 138 and the connection piece 140 are welded together. However, it is noted that numerous other mechanisms could be used to secure the pieces 136, 138, 140 together in a manner that would be suitable for use with the present invention. It is also noted that in some embodiments, the three pieces 136, 138, 140 could be molded as a single piece.

Fastener 122—which in the present case is a u-shaped fastener—is secured to connection piece 140. Fastener 122 is equipped with holes 151 corresponding to holes 150 in the hook latch 124. Thus, with a nut and bolt, or numerous other mechanisms that would be apparent to one skilled in the art, the hook latch 124 is coupled to the fastener 122 in a manner that allows it to rotate and thereby engage and disengage latching post 152 (FIGS. 20-21).

As best seen in FIGS. 17-19, the hook latch 124 can include two side pieces 142, 144 separated by spacer 146—which also serves to protect hook latch 124 from damage. In one embodiment, a threaded receptacle, such as a tightening nut 148, can be included between the side pieces 142, 144. As will become more evident below, the tightening nut 148 is advantageous in that it allows the longevity of the transport device 100 to be increased. Specifically, by inserting a bolt into the tightening nut (and adjusting as needed), the hook latch 124 is able to effectively grasp as the latching post 152 even as the post 152 wears down over time.

It is noted that hook latch 124 is shown in the present embodiments as two substantially parallel side pieces 142, 144. However, in other embodiments, the hook latch could be a single piece.

Figure 20:
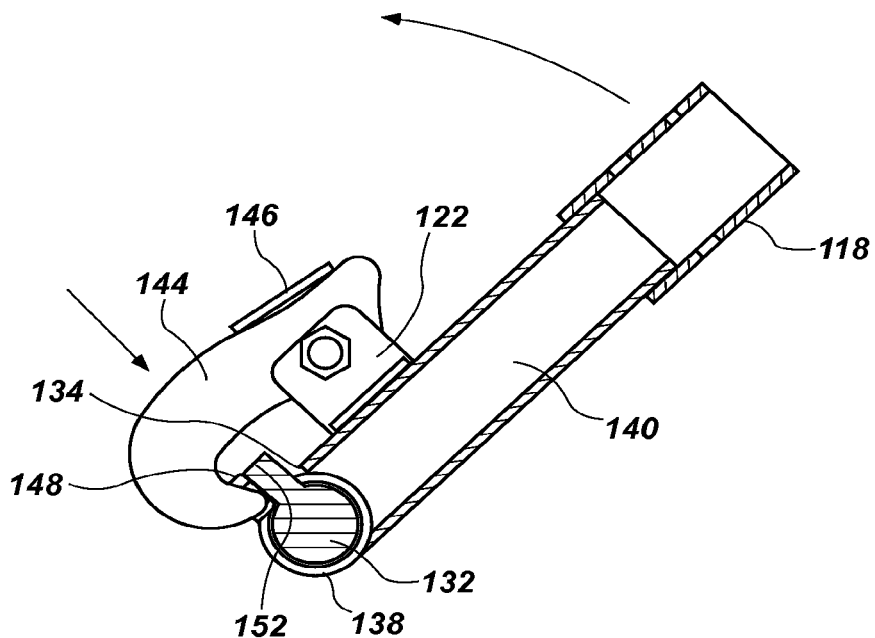
FIG. 20 shows a hook and latch assembly in a latched position according to one embodiment of the present invention.
Figure 21:
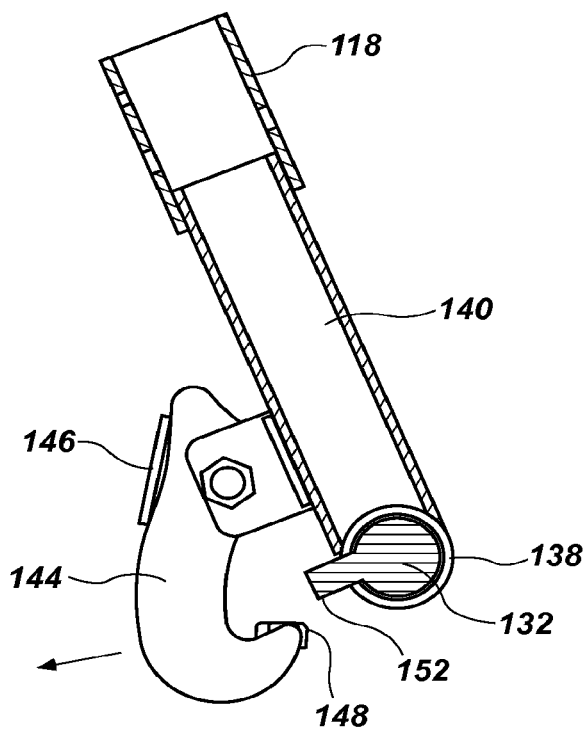
FIG. 21 shows the hook and latch assembly of FIG. 20 in an unlatched position.
Figure 22:
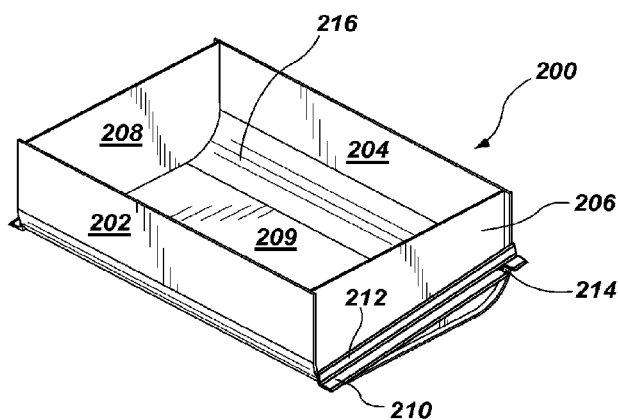
FIG. 22 shows a front elevation view of a removable bucket according to one embodiment of the present invention.
Figure 23:
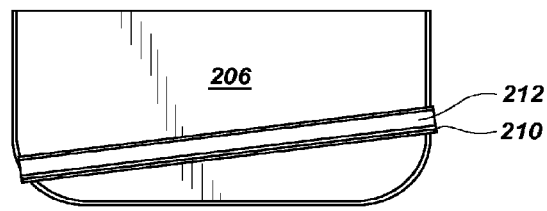
FIG. 23 shows a side view of the removable bucket of FIG. 22.
Figure 24:
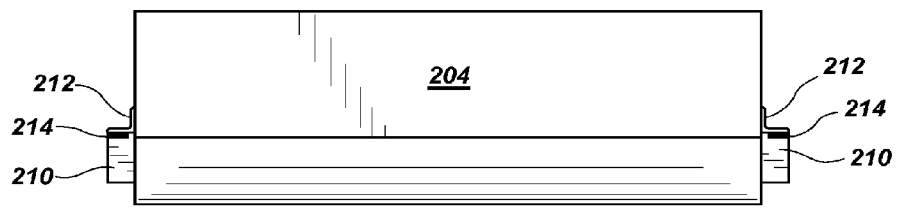
FIG. 24 is a rear view of the removable bucket of FIG. 22.
Figure 28:
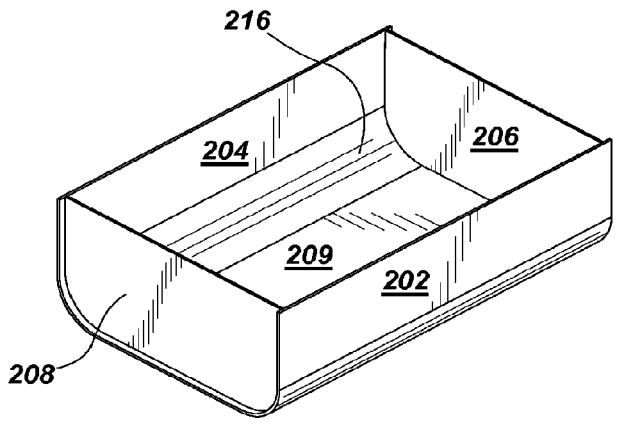
FIG. 28 is a front elevation view of a bucket according to one embodiment of the present invention.
Figure 29:
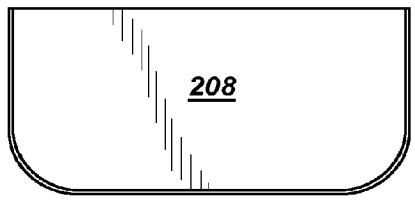
FIG. 29 is a side view of the bucket of FIG. 28.
Figure 30:
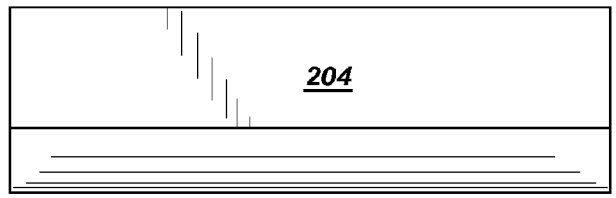
FIG. 30 is a rear view of the bucket of FIG. 28.
Figure 31:
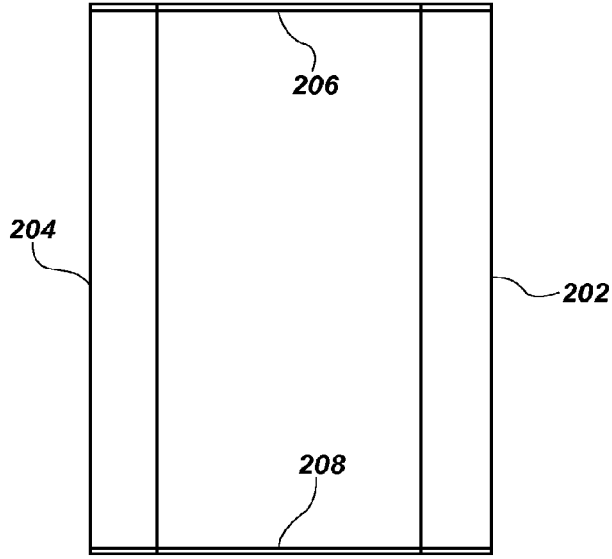
FIG. 31 is a top view of the bucket of FIG. 28.
Figure 32:
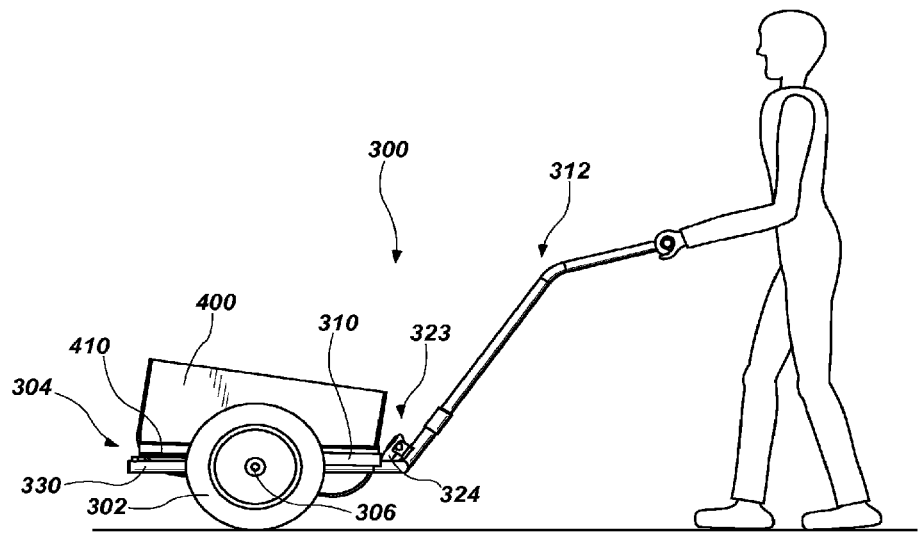
FIG. 32 is a side view showing a user pushing a transport device according to one embodiment of the present invention.

As best seen in FIGS. 20-21, when the handle assembly 112 is pushed forward, hook latch 124 slips over the latching post 152—which as noted below is secured to the back bar 133 of frame 104 and thus, the arms 130. When the handle assembly 112 is gently pulled back, the hook engages the post 152, which in turn pulls the arms 130 in an upward direction.

Figure 36:
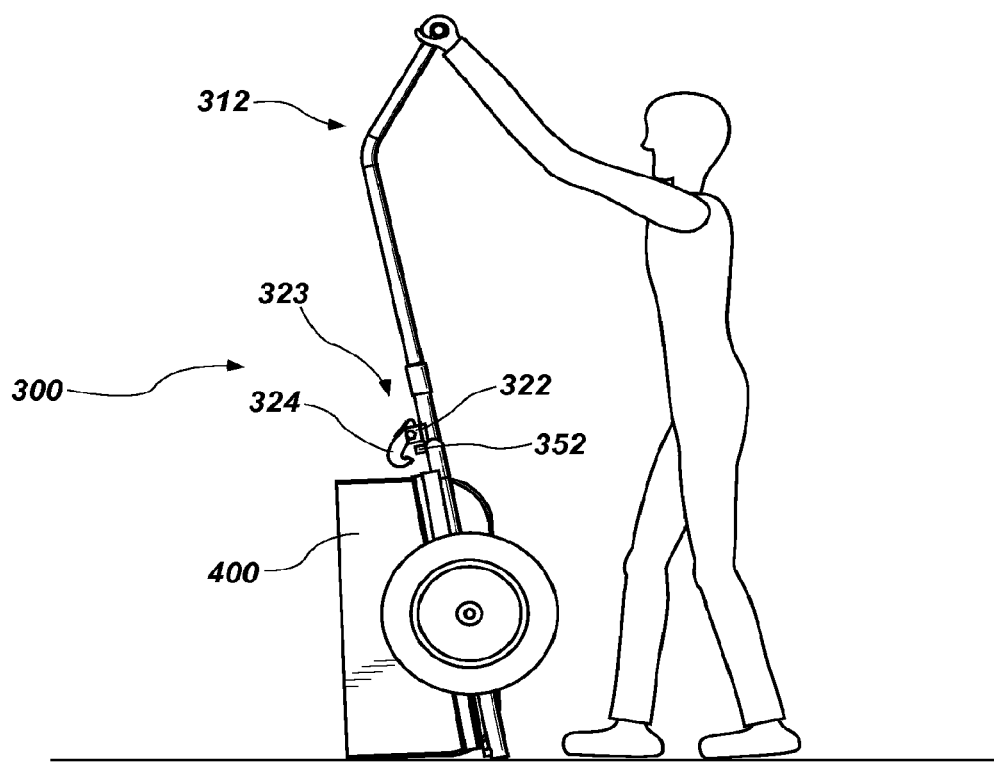
FIG. 36 is a side view showing a user at yet another stage of dumping a transport device according to one embodiment of the present invention.
Figure 37:
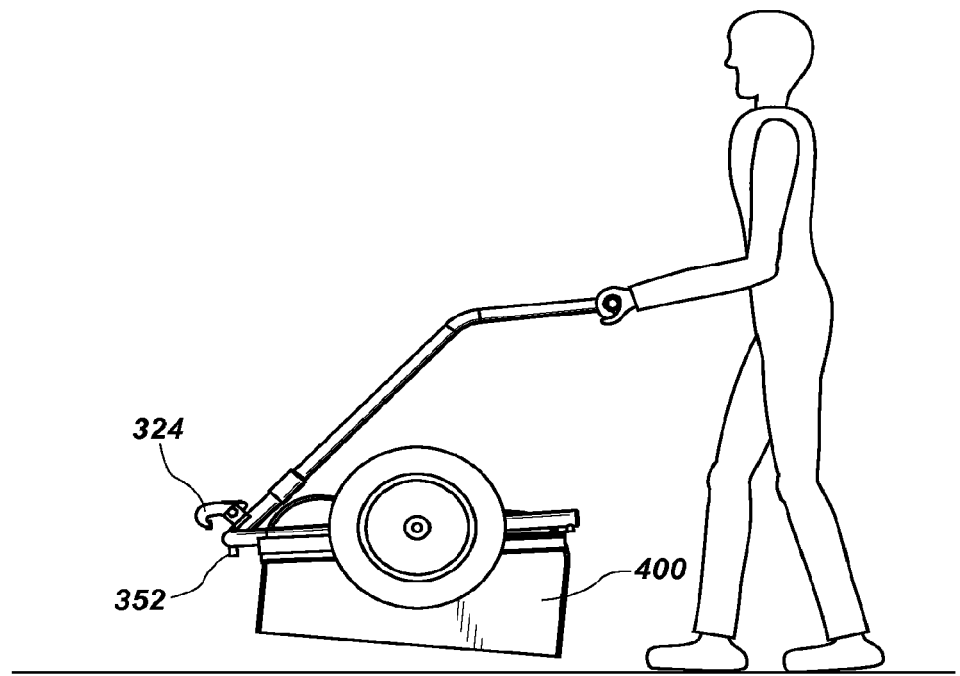
FIG. 37 is a side view showing a user overturning a transport device according to one embodiment of the present invention.

When the handle assembly 112 is pushed upward and forward, as when emptying the bucket 200, the bottom edge 134 of connection piece 140 rotates forward until it substantially abuts against latching post 152. This allows the hook latch 124 to disengage from the hooking post 152 and swing forward. As depicted in FIGS. 36 and 37, handle assembly can then be pulled back and used to tip bucket (400 in FIGS. 36-37) until substantially upside down.

In the present embodiments, the latching assembly 123 connects to handle assembly 112 at sleeve 118. In certain embodiments, sleeve 118 can be used to both secure the handle assembly 112 to the latch assembly 123, and also to allow pivoting the handle assembly 112 in a variety of orientations (FIG. 38).

Figure 40:
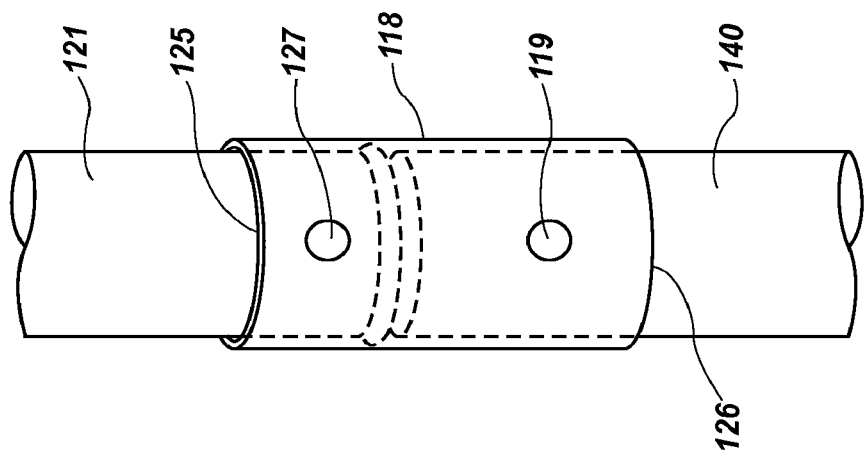
FIG. 40 is a front view of a handle connection mechanism according to one embodiment of the present invention.

For example, FIG. 40 illustrates one locking/pivoting mechanism that could be used in connection with the present device. The bottom edge of the handle piece 121 is fashioned to have a slightly larger external diameter—giving it a slight bulge on the end. This increase in external diameter could be accomplished by numerous mechanisms that would be apparent to one skilled in the art including, but not limited to, welds, hardware, etc. The end of the handle piece 121 could then be inserted into sleeve 118. Afterward, the top edge of sleeve 125 could be fashioned to decrease its internal diameter. Again, numerous mechanisms for doing so would be apparent to one skilled in the art including, but not limited to, welds, hardware, etc.

By tightening or otherwise securing fastening mechanism 127—which in one embodiment is a screw or pin—the rotational movement of handle piece 121 can be substantially stopped. In like manner, by loosening the fastening mechanism 127, the handle piece 121 is able to rotate freely within the sleeve, but not fall out. Sleeve 118 is also connected to the connection piece 140 of the latch assembly 123 with fastening mechanism 119—which in one embodiment is a screw or pin. By loosening or removing fastening mechanism 119, the handle assembly 112 can be completely removed (e.g. for storage or transportation).

Figure 41:
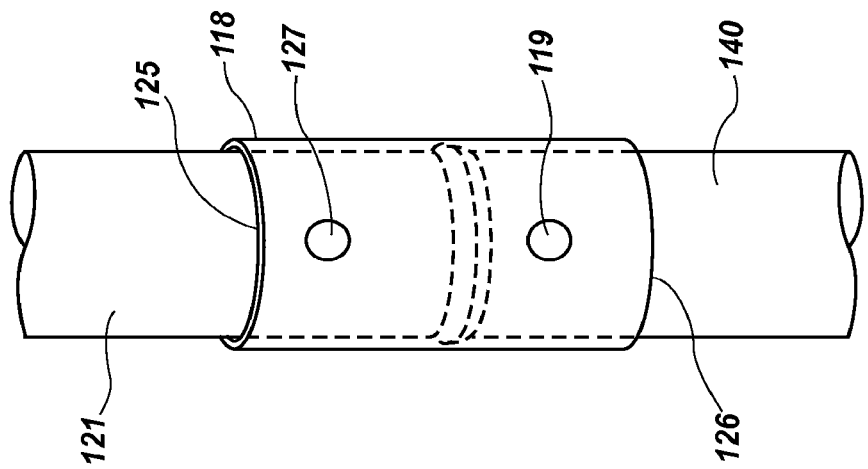
FIG. 41 is a front view of a handle connection mechanism according to one embodiment of the present invention.

The rotational movement of the handle assembly could also be accomplished by having the pivot point on the connection piece 140 of the latch assembly 123. For example, as seen in FIG. 41, the top edge of the connection piece 140 could be fashioned to have the bulge—e.g. a larger external diameter on its top edge. This increase in external diameter could likewise be accomplished by numerous mechanisms that would be apparent to one skilled in the art including, but not limited to, welds, hardware, etc.

The end of the connection piece 140 could then be inserted into sleeve 118. Afterward, the bottom edge of sleeve 126 could be fashioned to decrease its internal diameter. Again, numerous mechanisms for doing so would be apparent to one skilled in the art including, but not limited to, welds, hardware, etc. By tightening or otherwise securing fastening mechanism 119, the rotational movement of the handle assembly 112 can be substantially stopped. In like manner, by loosening the fastening mechanism 119, the connection piece 140 is able to rotate freely within the sleeve, but not fall out—which rotation is transferred to the handle assembly 112. In such an embodiment, the handle piece 121 would be non-rotatably attached to sleeve at 127.

Figure 46:
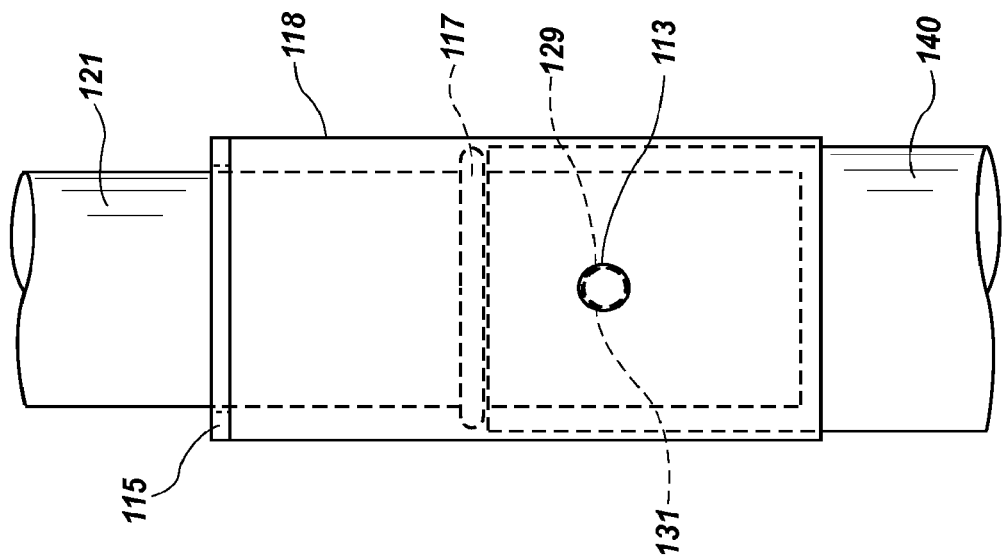
FIGS. 45-46 show a handle rotational locking mechanism according to one embodiment of the present invention.
Figure 45:
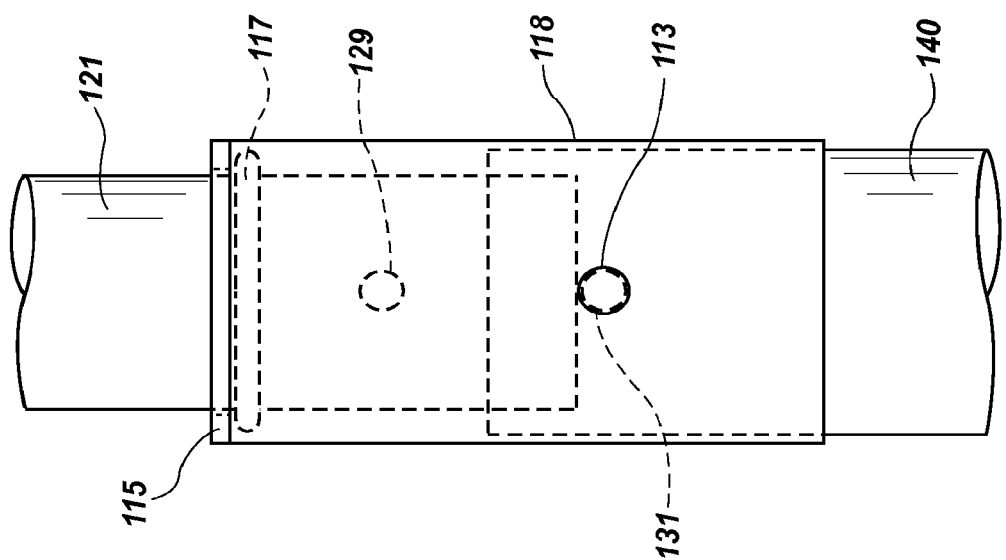
Figure 47:
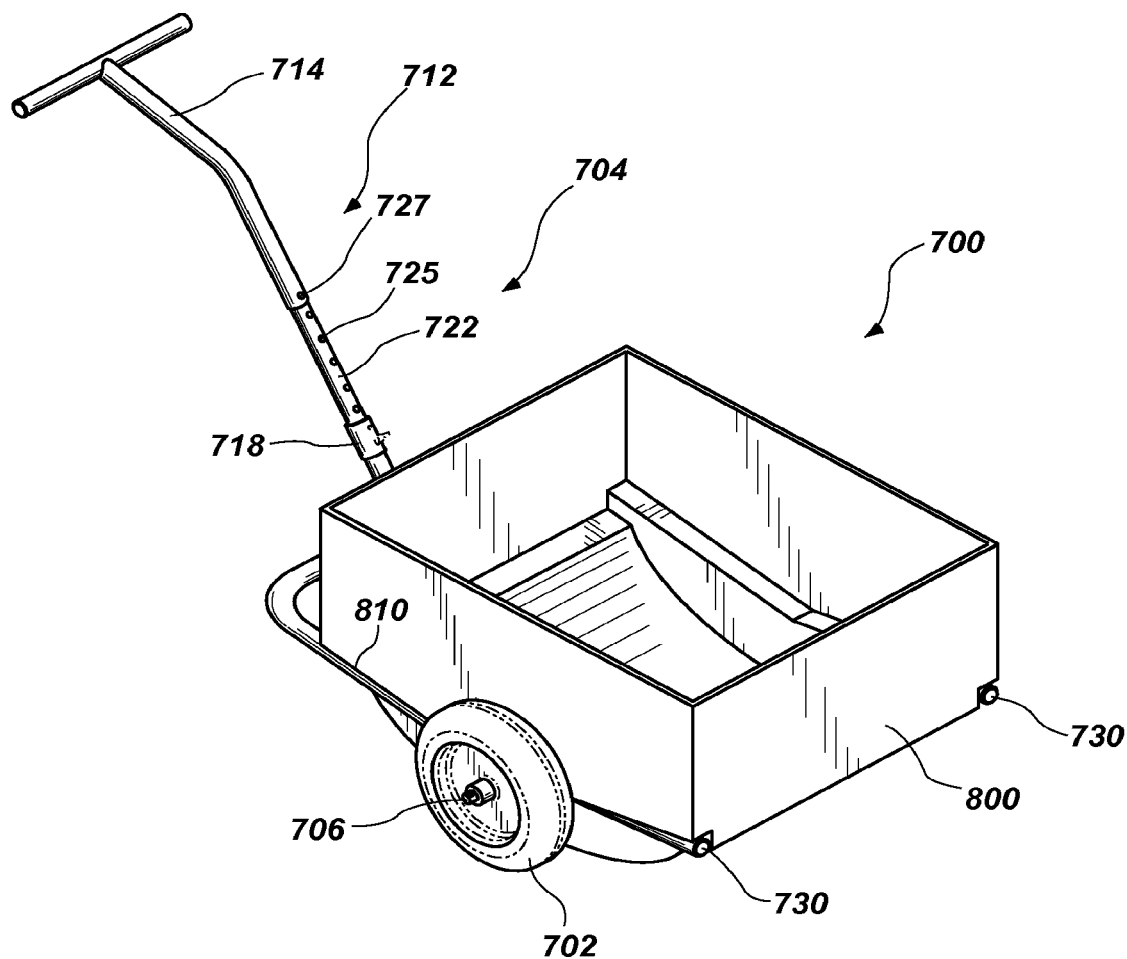
FIG. 47 shows a front perspective of a transport device with the bucket engaged according to one embodiment of the present invention.
Figure 48:
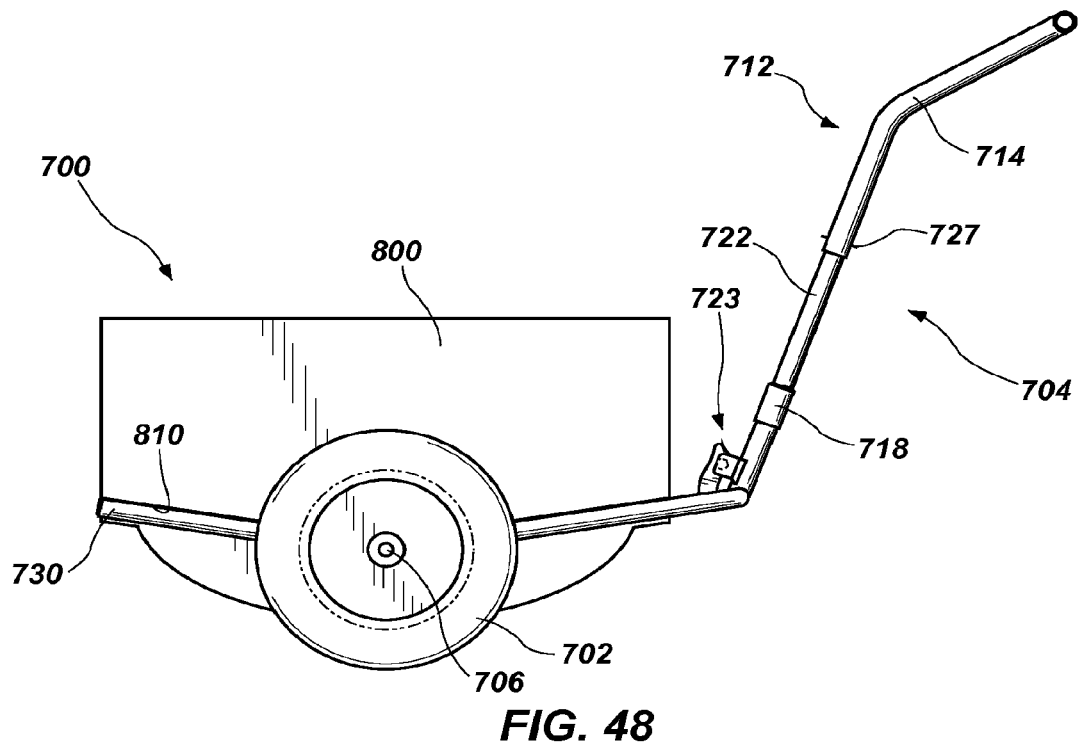
FIG. 48 shows a side view of the transport device of FIG. 47.
Figure 49:
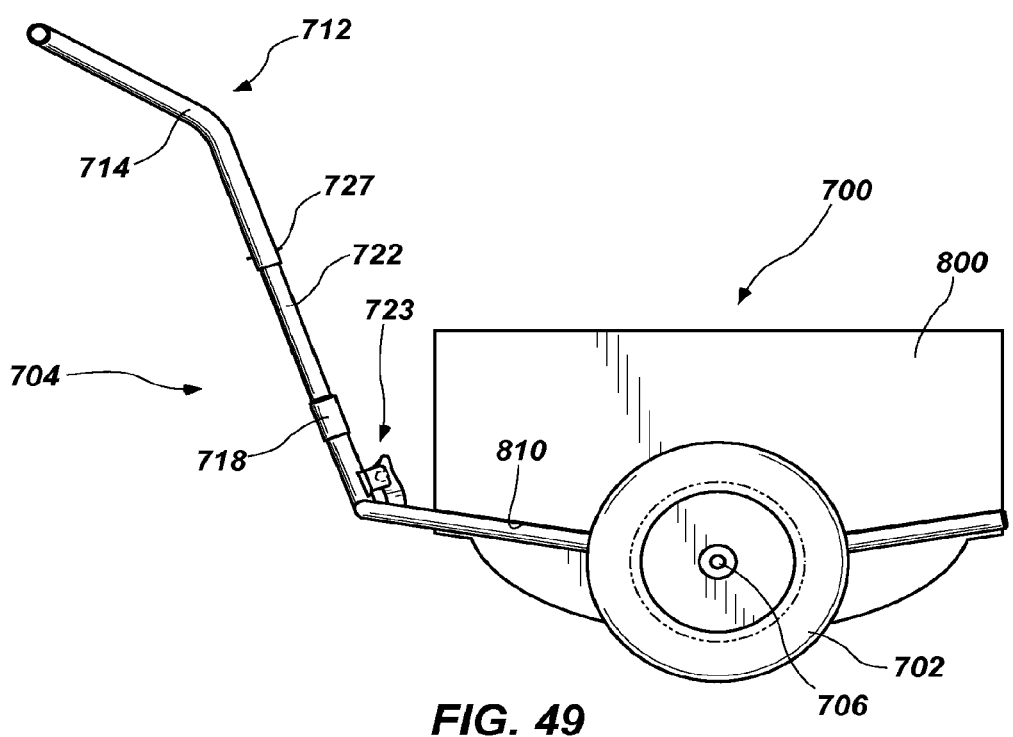
FIG. 49 shows an opposite side view of the transport device of FIG. 47.
Figure 50:
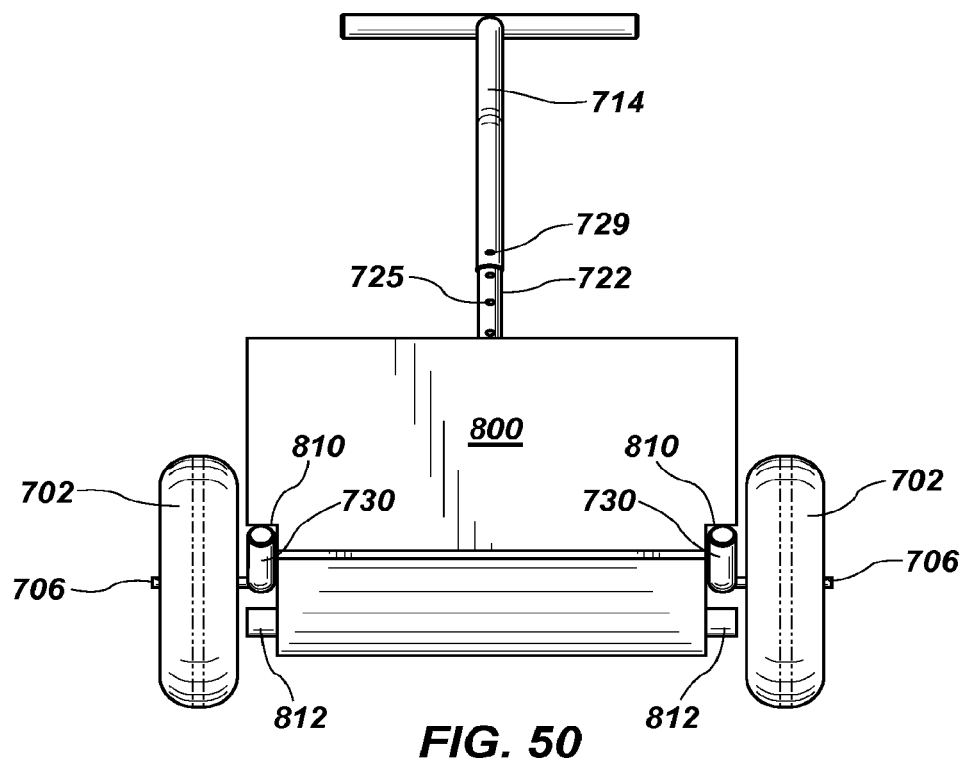
FIG. 50 shows a front view of the transport device of FIG. 47.
Figure 51:
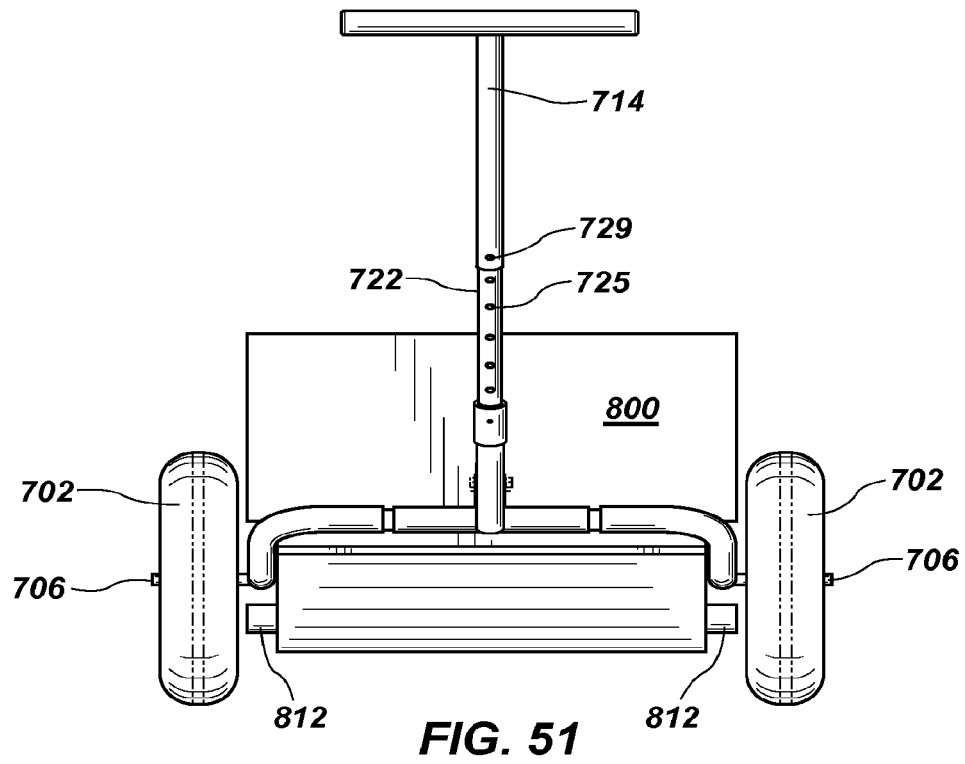
FIG. 51 shows a rear view of the transport device of FIG. 47.
Figure 52:
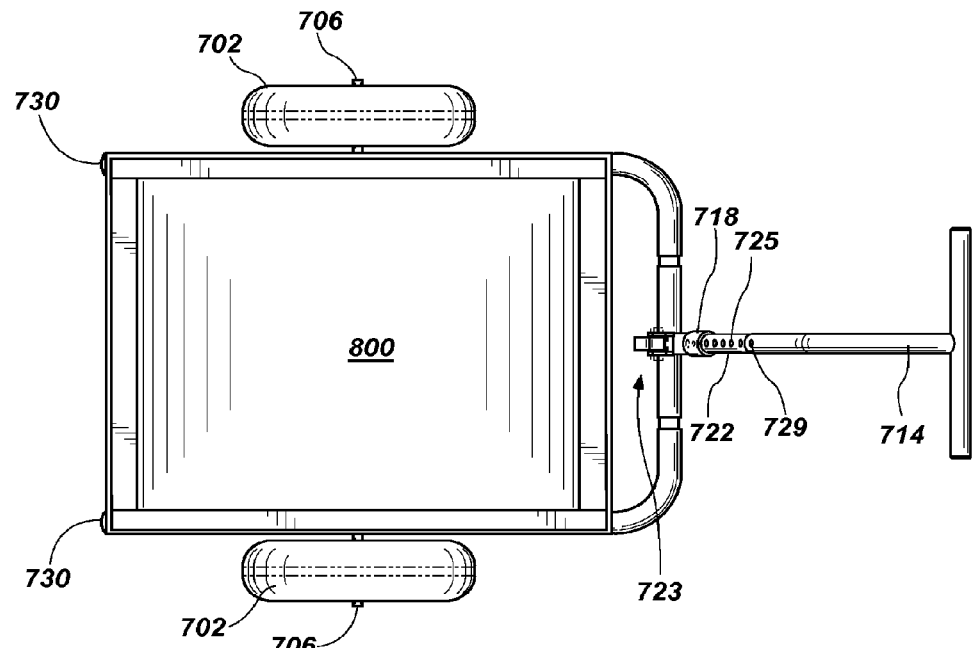
FIG. 52 shows a top view of the transport device of FIG. 47.
Figure 53:
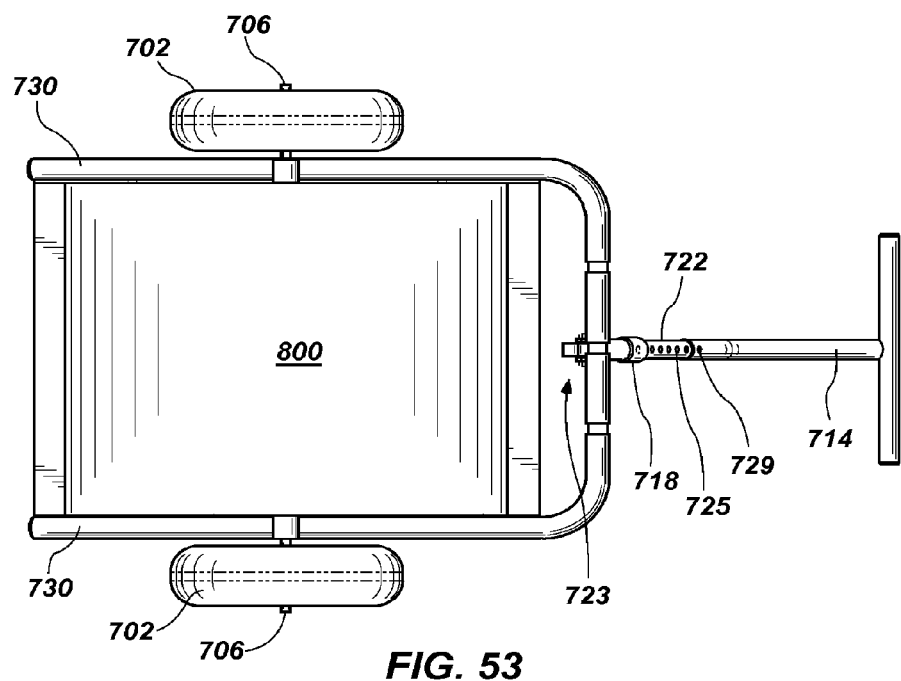
FIG. 53 shows a bottom view of the transport device of FIG. 47.
Figure 54:
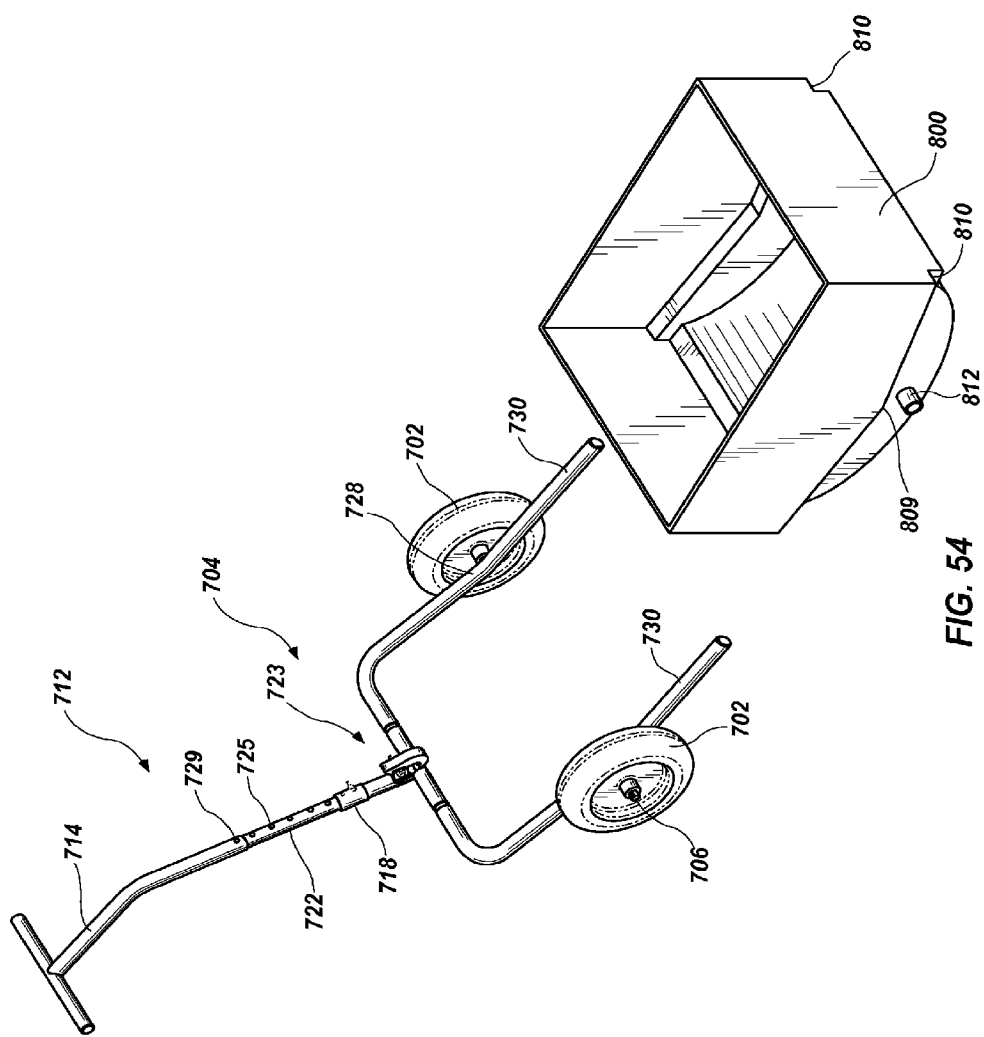
FIG. 54 shows a front perspective of a transport device with the bucket disengaged according to one embodiment of the present invention.

Of course, it is noted, that in some embodiments, it may be desirable to have rotational mechanisms on both the handle piece 121 and the latch piece 123. In yet other embodiments, it may be desirable to remove the rotational mechanism features altogether. In FIGS. 45-46, a different handle locking mechanism is shown according to one embodiment of the present invention. In this embodiment, there is again a handle piece 121, a connection piece 140 and a sleeve 118. Handle piece 121 has an exterior diameter that is smaller than the interior diameter of connection piece 140. The exterior diameter of connection piece 140 is smaller than interior diameter of sleeve 118. Thus, handle piece 121, connection piece 140 and sleeve 118 are capable of being telescopically expanded or collapsed. All three pieces include holes 129, 113, 131 into which a pin, bolt or other fastening mechanism can be inserted. As can be seen in FIG. 45, handle piece 121 is equipped with an external diameter expander 117—which in this case is a welded ring, but the external diameter could be expanded in whole or in part with numerous other mechanisms that would be apparent to one skilled in the art including partial rings; hardware such as screws; etc. In this embodiment, the inside top edge 115 of sleeve is equipped with a diameter reducer 115. As with the diameter expander 117, in this case, it is a welded ring but could be reduced in whole or in part with numerous other mechanisms that would be apparent to one skilled in the art including partial rings; hardware; etc. When a user wishes to be able to rotate the handle piece 121, he would simply raise handle piece 121 so that its bottom edge is above holes 113, 131. A fastening mechanism such as a pin or bolt can then be inserted into holes 113, 131 securing connection piece to sleeve 118. In some embodiments, the bottom edge of handle piece 121 can rest on top of the fastening mechanism when in this configuration. Diameter expander 117 keeps handle piece 121 rotatably connected to sleeve 118. As seen in FIG. 46, when a rotating handle is not desired, one would remove the pin of other fastening mechanism from holes 131, 113. Handle piece 121 could then slide down until the diameter expander 117 is substantially flush with the top edge of connection piece 140. In such a configuration, all three holes 129, 113, 131 are aligned such that a pin, bolt or other fastening mechanism could be inserted.

The rotational movement of the handle assembly is advantageous in that it allows the transport device 100 to be easily moved in a relatively small space. Specifically, rotating the handle assembly 112 allows maneuverability comparable to that found in one-wheeled transport devices but does so with much greater stability and balance.

The base pieces 136 and 138 of latching assembly 123 engage the back bar 133 of frame 104 and in this manner connect the latching assembly 123 to the frame 104. Specifically, in the present embodiments, the back bar 133 of frame 104 has a smaller exterior diameter relative to the interior diameter of the base pieces 136, 138. This allows the latching assembly 123, when attached, to rotate around the back bar 133.

Figure 3:
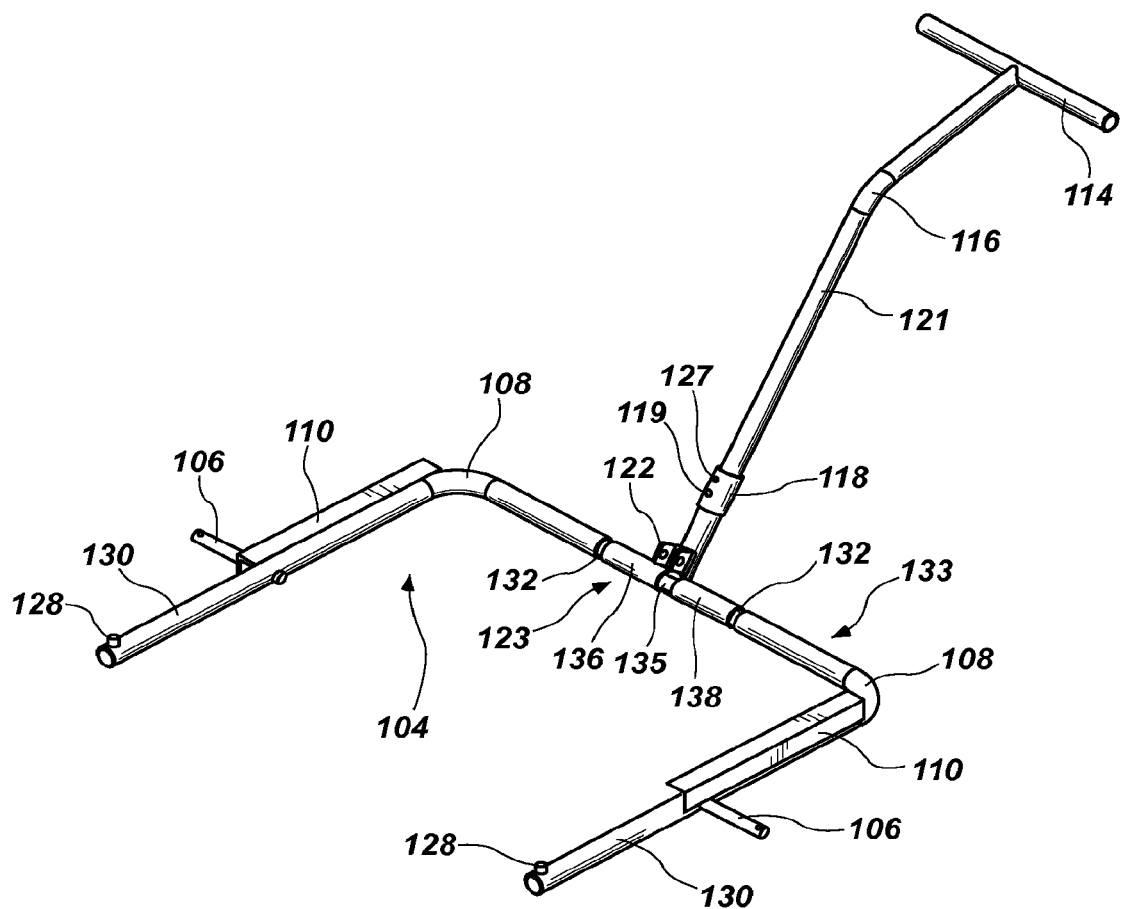
FIG. 3 shows a front elevation view of a partial frame, latch and handle assembly according to one embodiment of the present invention.
Figure 4:
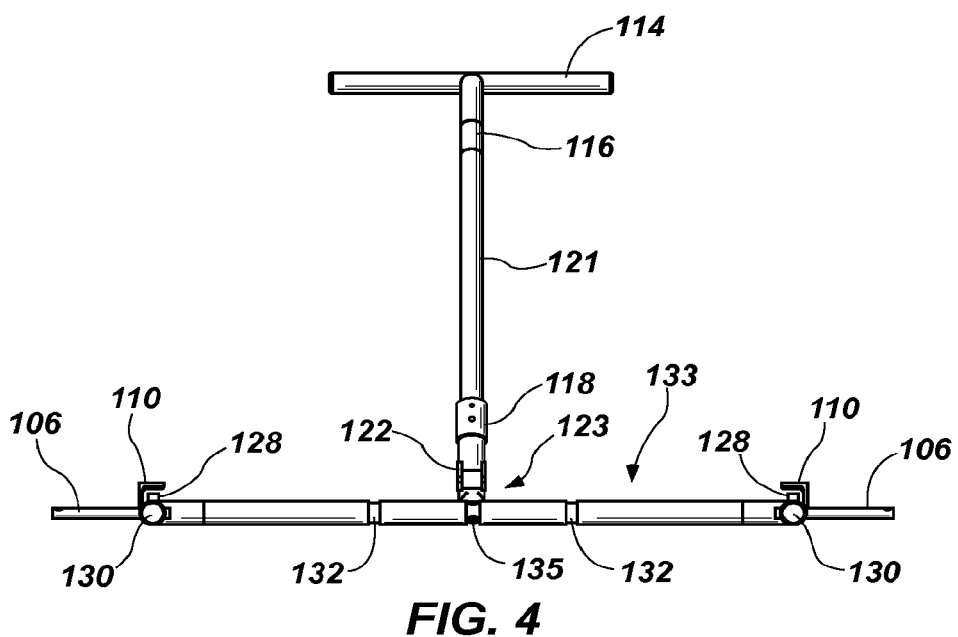
FIG. 4 shows a front view of the partial frame, latch and handle assembly depicted in FIG. 3.
Figure 9:
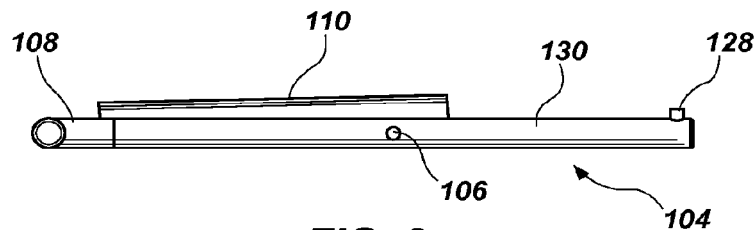
FIG. 9 shows a side view of a partial frame assembly according to one embodiment of the present invention.
Figure 10:
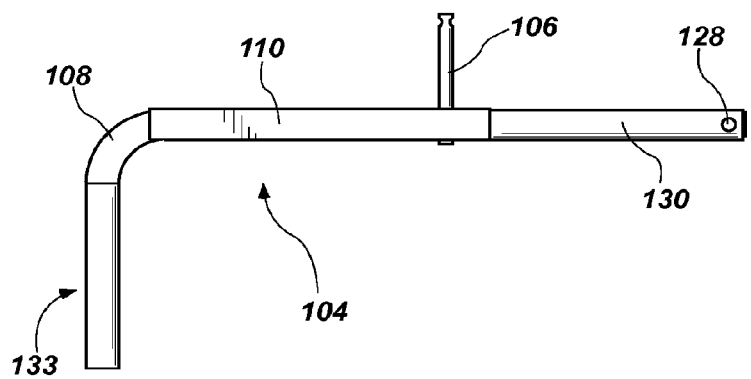
FIG. 10 shows a top view of the partial frame assembly of FIG. 9.
Figure 11:
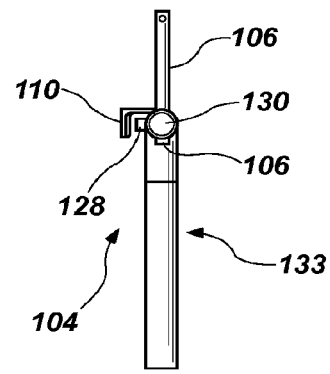
FIG. 11 shows a front view of the partial frame assembly of FIG. 9.
Figure 12:
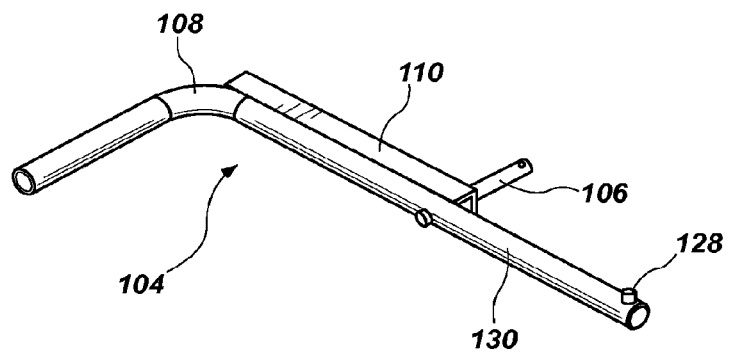
FIG. 12 shows a front elevation view of the partial frame assembly of FIG. 9.

This rotatability can be accomplished in several ways. For example, as best seen in FIGS. 3 and 4, the back bar 133 can be segmented where a piece of cylindrical steel 132 having an exterior diameter that is slightly smaller than the interior diameter of the base pieces 136, 138 is inserted through the channels created by base pieces 136, 138. The ends of the cylindrical steel piece 132 are then inserted into right and left side pieces of the frame and secured (so they do not rotate). The securing of the cylindrical steel 132 into the frame pieces could be accomplished by numerous mechanisms that would be apparent to one skilled in the art including, but not limited to, welding and hardware.

Once the latching assembly 123 has engaged the back bar 133 of the frame 104, a latching post 152 (FIGS. 20 and 21) can be attached at 135. The latching post 152 in the present embodiments is affixed to the smaller diameter piece 132 of the back bar 133. It is noted that the latching post 152 is shown as a cylindrical shape but need not be. It could be planar; columnar; or countless other shapes that could engage the hook latch 124 as would be apparent to one skilled in the art.

The transport device 100 also includes a removable bucket 200. It is noted that the term "bucket" is not intended to be limited to any particular shape and is intended to include numerous configurations of a defined enclosure. In some embodiments, the buckets 200 have a substantially rectangular profile; in others, the profile is substantially square; in some, the bottom is rounded on both sides; in others the bottom is rounded on only a single side.

Referring now to FIGS. 1-2 and 22-31, the bucket 200 is generally characterized by an enclosure defined by four walls 202, 204, 206, 208 and a bottom 209. The bucket 200 includes a track mechanism 210 affixed to its sides. In one embodiment, the track 210 includes a vertical element 212 that is used to attach the track 210 to the side of the bucket 200. As best seen in FIGS. 25-27, the track 210 and vertical element can be a single L-shaped piece of steel. In other embodiments, the track 210 could be created by aligning multiple smaller pieces. Sometimes the smaller track pieces could be immediately adjacent to one another; in some instances, it may be desirable to have gaps between the track pieces.

The track 210 can include one or more notches 214 that are capable of being engaged by catchers 128 on the arms 130 of frame 104. In the present embodiments, the notches 214 are small cuts into the track 210. However, it is noted that in other embodiments, the track 210 could be engaged by catchers 128 in numerous other ways. For example, the catchers 128 could be recesses in the arms 130 and the track 210 could include a protrusion, such as a post, that is capable of being engaged by the catchers 128. In yet other embodiments, the catchers could be hooks substantially on the end tips of the arms 130 that are able to engage the bucket 200. In yet other embodiments, there could be hooking mechanisms on the bucket 200 and corresponding loops or other engagement mechanisms on the arms 130.

The track 210 in the presently described embodiments is angled such that it slopes toward the front of the bucket 200. This allows a user to more easily place the arms 130 underneath the track and thereby engage the bucket 200. It also allows for the bucket 200 and contents thereof to remain more level when the bucket 200 is lifted—thus minimizing spillage. However, it is noted that in some embodiments, it may be desirable for the track 210 to be substantially parallel to the bottom of the bucket 200.

It is also noted that in certain embodiments the bottom front of the bucket 200 can be rounded—which, as noted above, allows for easier emptying. In other embodiments, the bucket can be rounded on the rear side 216 to allow for easier tipping when transporting. In other embodiments, it may be desirable to have rounded corners on both the front and rear of the bucket 200.

Figure 42:
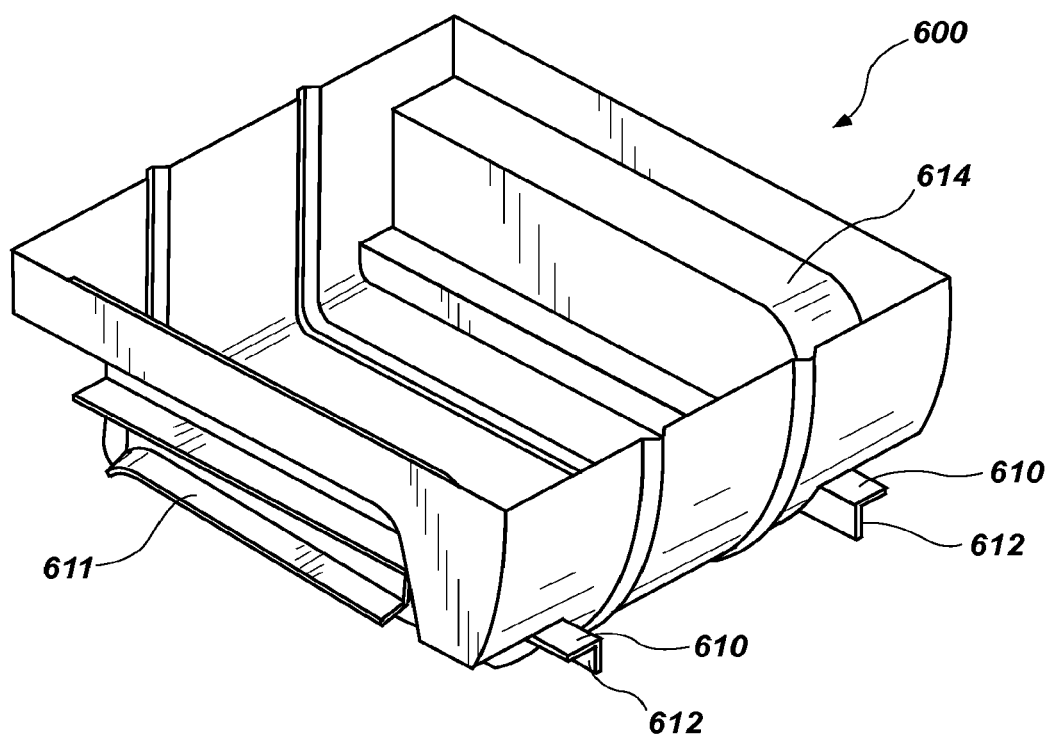
FIG. 42 is a front elevation of a removable bucket according to yet another embodiment of the present invention.

FIG. 42 shows a bucket configuration having wheel wells 614. This feature is advantageous in that it helps keep the wheels and axle debris free. For example, if the bucket is placed at the end of a conveyor belt, any over-filling can cause materials to spill out onto the wheels and axles. The wheel-wells provide a barrier to such spillage. It is also noted that in some instances, it is desirable to align several buckets side by side for filling. By utilizing the wheel-well bucket configuration, maneuvering the arms under the track 610 can be done—even when there is little or no space on the sides of the bucket 600. As mentioned above, it is also noted that in this particular embodiment, the guide pieces 611 are affixed to the bucket 600 rather than on the frame. It is also noted that in this embodiment, the track 610 is secured to the bucket with vertical pieces 612, though it is noted that in this embodiment the relative orientation of track 610 and vertical pieces 612 is inverted.

Figure 43:
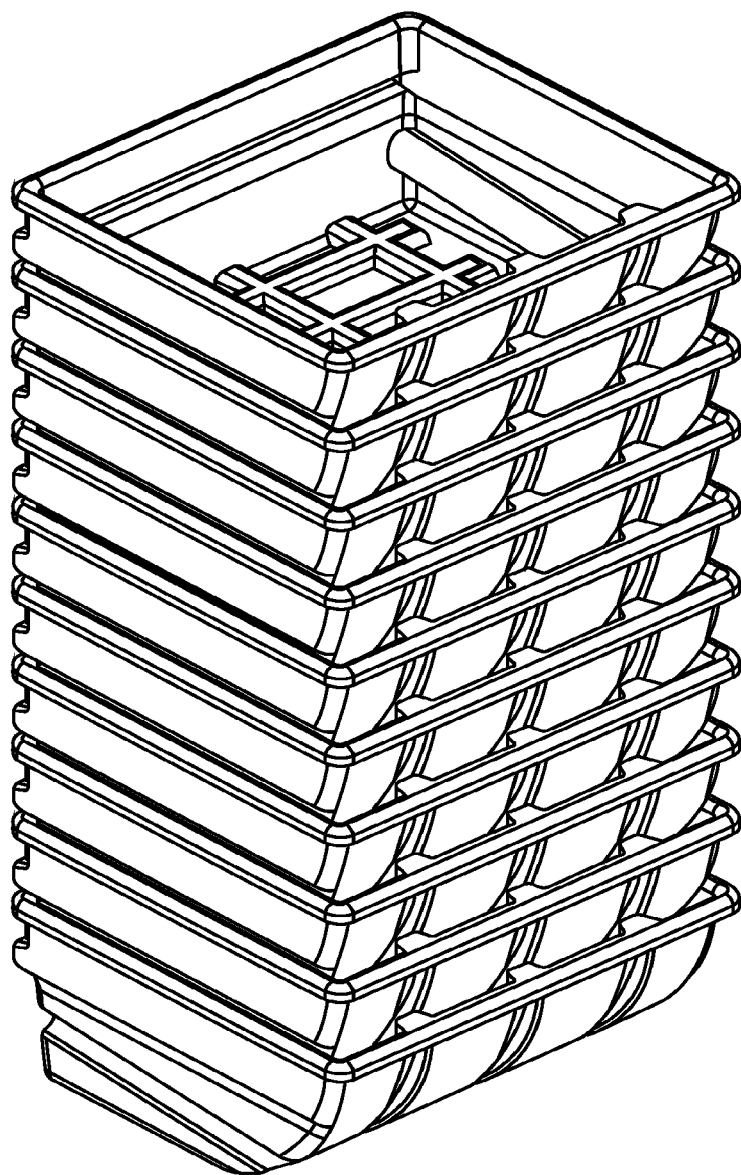
FIG. 43 is a front elevation view of a stack of removable buckets according to one embodiment of the present invention.

FIG. 43 shows a bucket configuration that is stackable according to one embodiment of the present invention. One advantage of having a removable bucket is that it allows a user to have multiple buckets and a single conveying mechanism (i.e. the frame/latch/handle assemblies). When not in use, the buckets could be stacked and stored occupying a comparatively small storage space.

Figure 44:
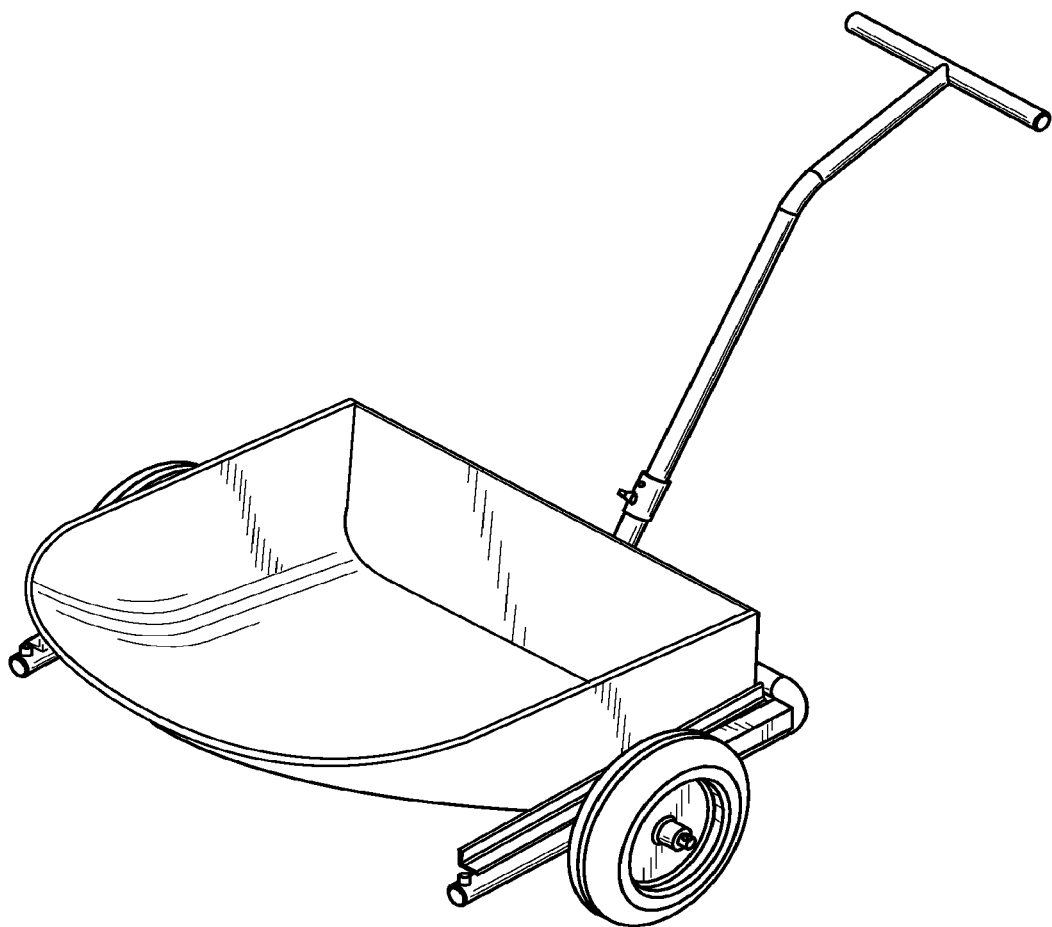
FIG. 44 shows yet another bucket configuration according to one embodiment of the present invention.

FIG. 44 shows yet another bucket configuration having a more conventional wheelbarrow front pouring edge.

FIGS. 47-56, show yet another embodiment of a transport device 700 having many similar or identical features to those discussed above including, but not limited to, a removable bucket 800 having tracks 810 on the outside surfaces; a frame assembly 704 having one or more arms 730 corresponding to and capable of engaging the tracks; one or more movement mechanisms 702 such as wheels coupled to the frame assembly 704; a latching assembly 723 rotatably coupled to the frame assembly 704; and a handle assembly 712 coupled to the latching assembly 723.

However, in the present embodiment, the frame assembly 704 includes bends 728 in the arms 730. In this embodiment, the bends 728 are proximate the axles 706 to which wheels 702 are secured. However, in other embodiments, the bends 728 could be at other locations on the arms 730. These bends 728 correspond to tracks 810 on bucket 800. In this embodiment the track 810 is a substantially v-shaped overhang 809 created by a narrowing in the bottom of the bucket 800. In other embodiments, the track 810 could have other configurations that include, but are not limited to, substantially u-shaped, or multi-angular.

One or more posts 812 can also be included beneath the tracks 810. Posts 812 serve to guide the arms 730 as they engage the tracks 810. They can also provide leverage and help hold the bucket 800 in places when it is being tipped for dumping. The posts 812 shown in this embodiment are substantially circular in cross section having a length approximately the same as the width of the track 810. However, in other embodiments, the posts could be different cross-sectional shapes and different lengths.

As noted above bucket 800 can be in varying configurations. For example, the front of the bucket can be rounded—which, as noted above, allows for easier emptying. In other embodiments, the bucket can be rounded on the rear side to allow for easier backward tipping when transporting. In other embodiments, it may be desirable to have rounded corners on both the front and rear of the bucket.

These embodiments also illustrate a unique handle assembly 712. In particular, this embodiment includes a handle portion 714 that corresponds to an adjuster element 722 that is further coupled to the latching assembly 723 at sleeve 718. The adjuster element 722 has an exterior diameter that is slightly smaller than the inter diameter of the handle portion 714 and the sleeve 718. The handle portion 714 also includes one or more holes 729 that correspond to one or more holes 725 in the adjuster element 722. Thus, handle portion 714 can be telescopically slid over the adjuster element 722 depending on the desired height of the handle assembly 712. Once in the approximate desired location, the holes 729, 725 are aligned and a fastener 727 can be inserted through both to secure the handle assembly 712 in place. The fastener 727 can then be subsequently removed and the handle portion 714 repositioned as needed.

Figure 55:
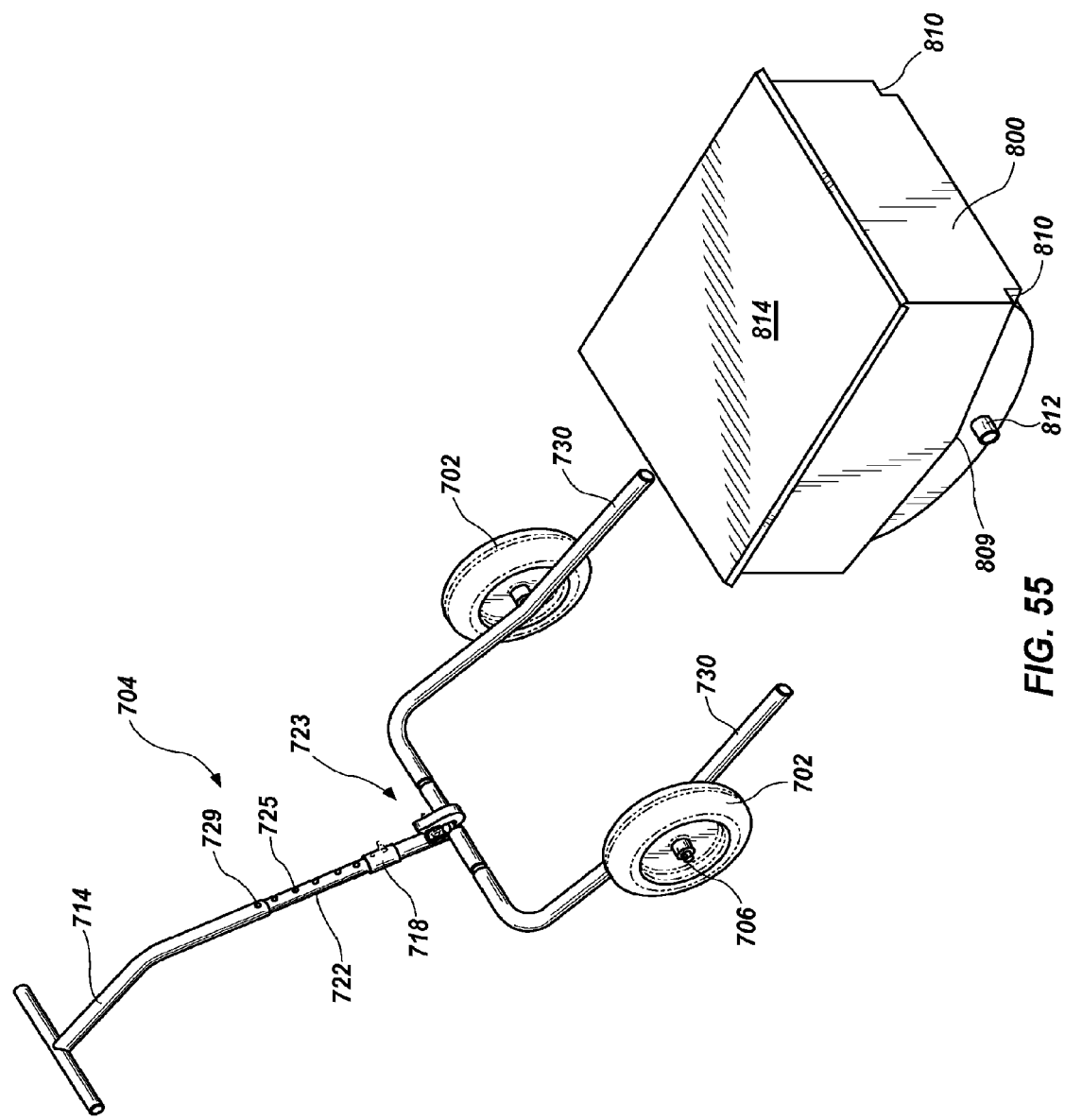
FIG. 55 shows a front perspective of a transport device with the bucket disengaged and fitted with a lid according to one embodiment of the present invention.
Figure 56:
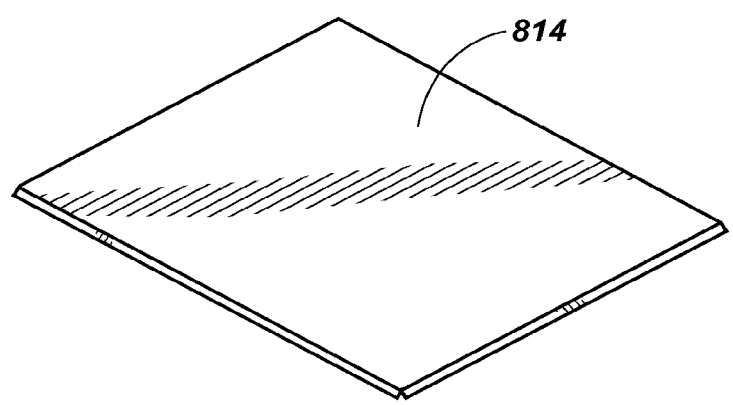
FIG. 56 shows a bucket lid according to one embodiment of the present invention.
Figure 57:
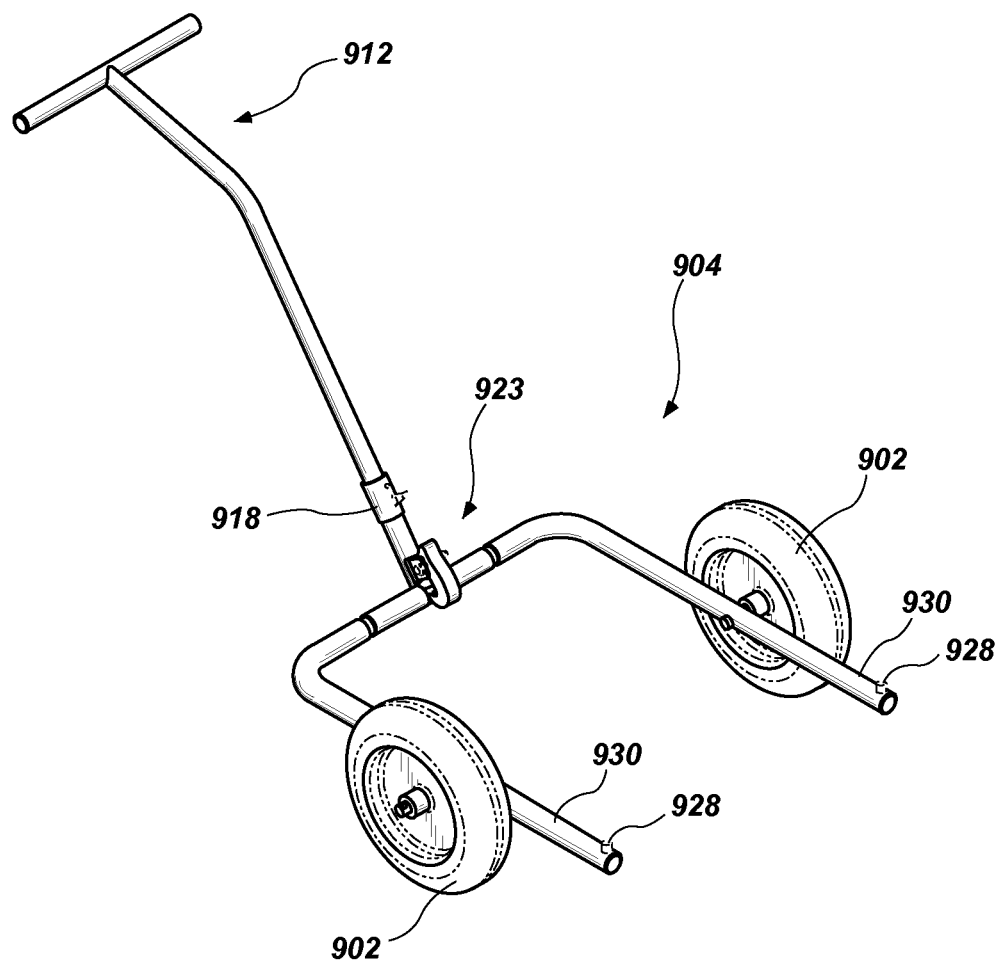
FIG. 57 shows a front elevation perspective view of a transport device cart according to one embodiment of the present invention.
Figure 58:
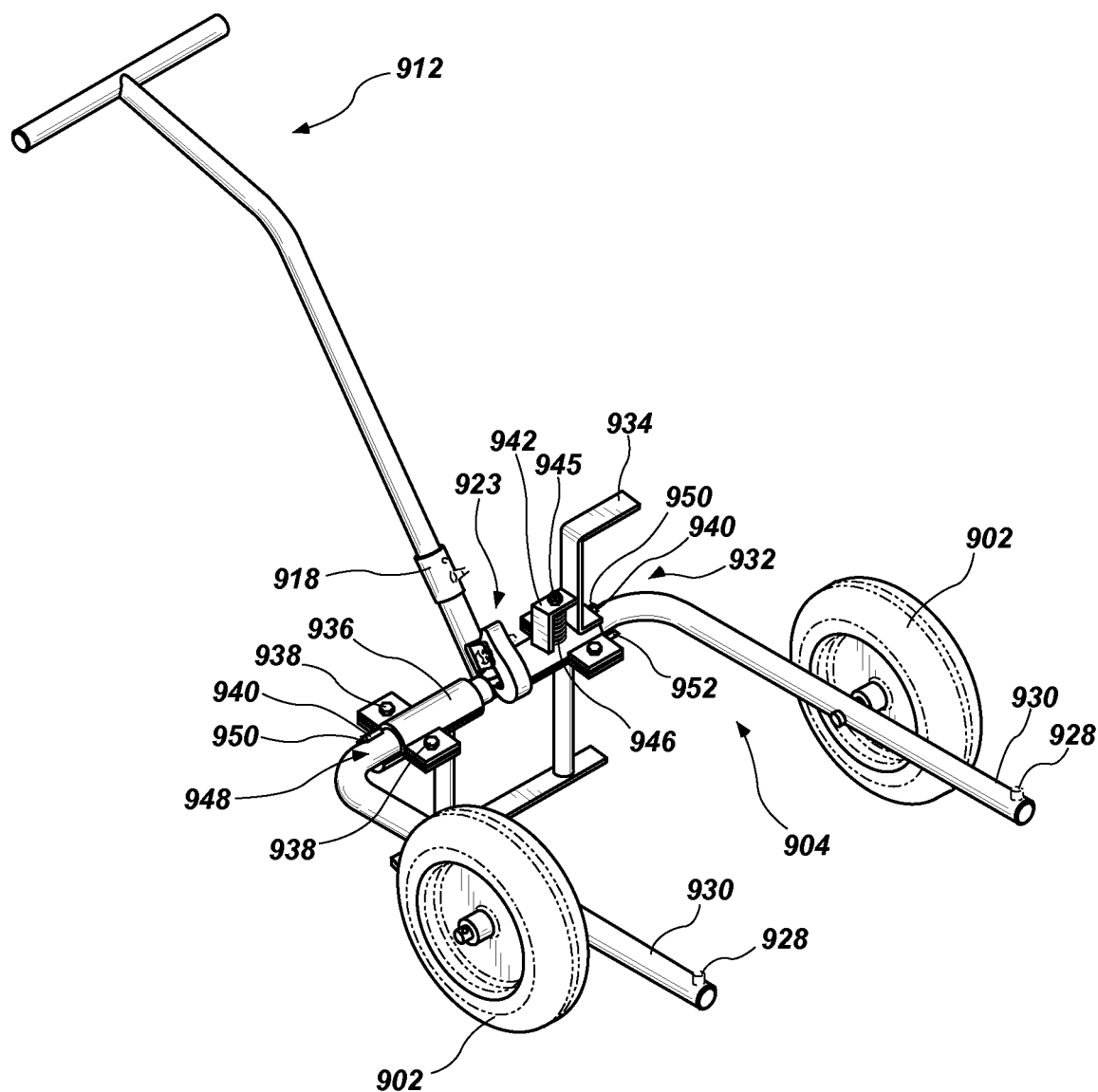
FIG. 58 shows a front elevation perspective view of a transport device cart according to one embodiment of the present invention.
Figure 59:
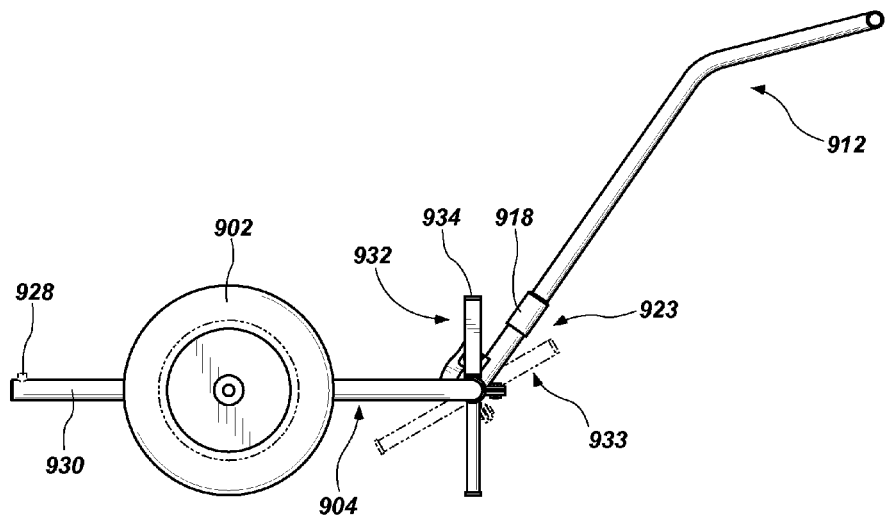
FIG. 59 shows a side view of the cart of FIG. 58.
Figure 60:
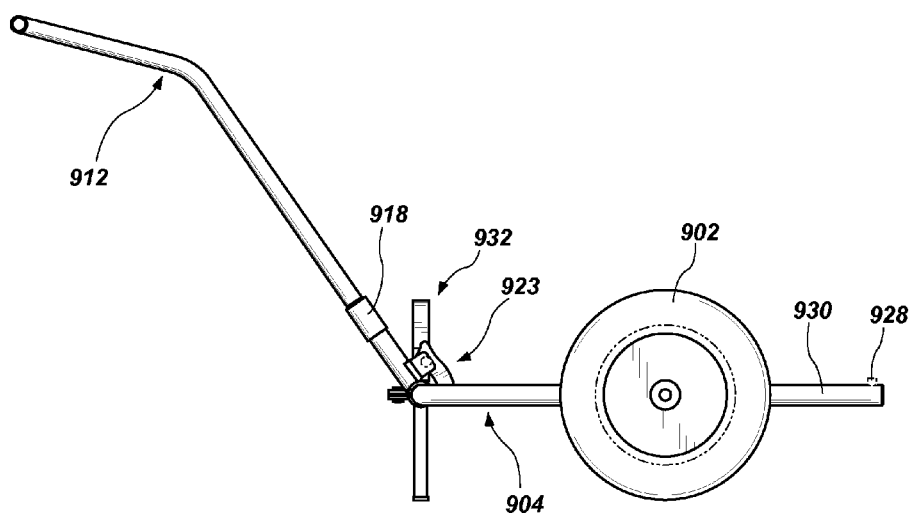
FIG. 60 shows an opposite side view of the cart of FIG. 58.
Figure 61:
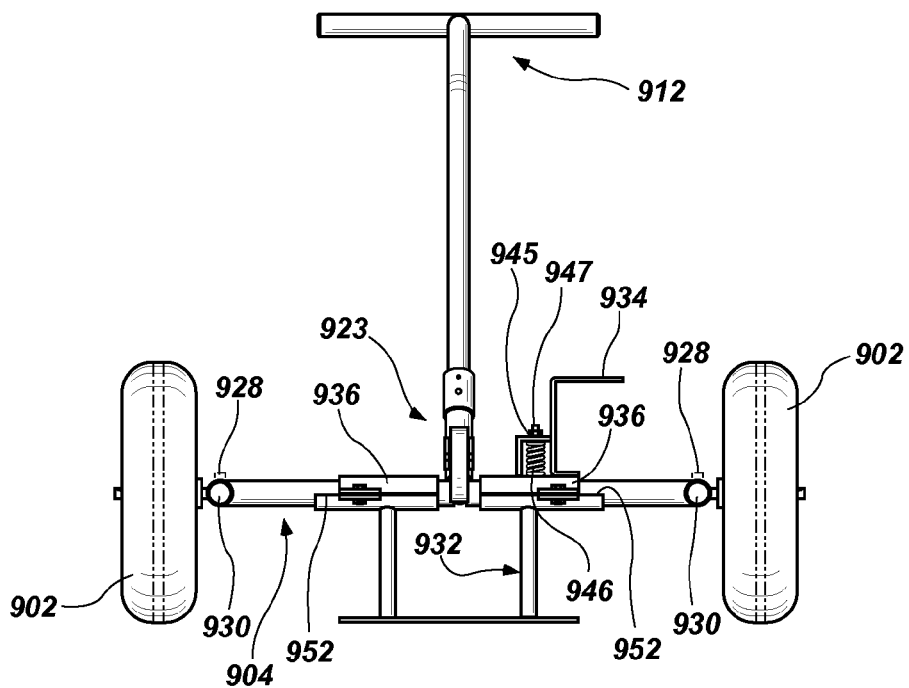
FIG. 61 shows a front view of the cart of FIG. 58.
Figure 62:
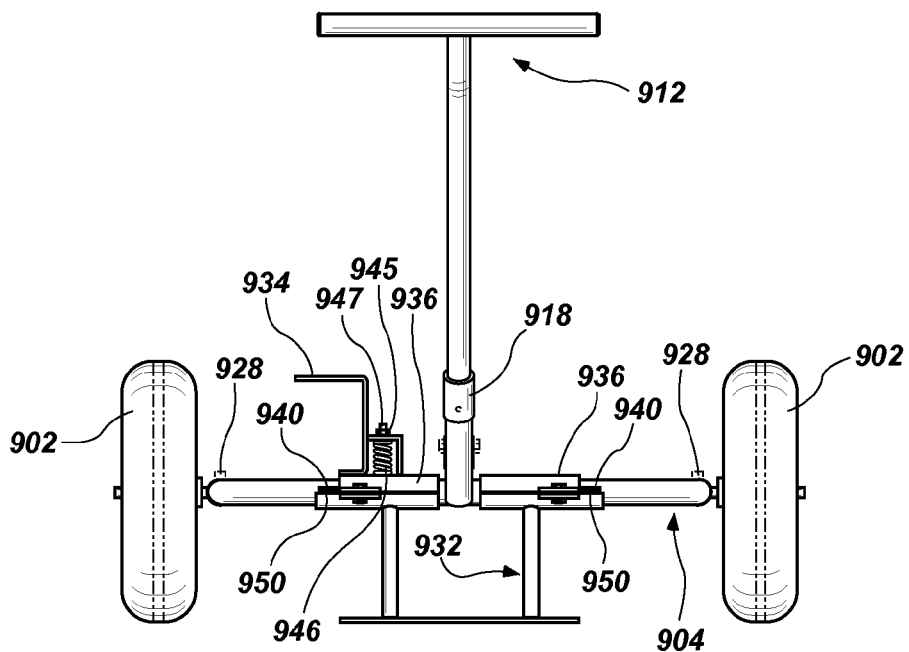
FIG. 62 shows a rear view of the cart of FIG. 58.
Figure 63:
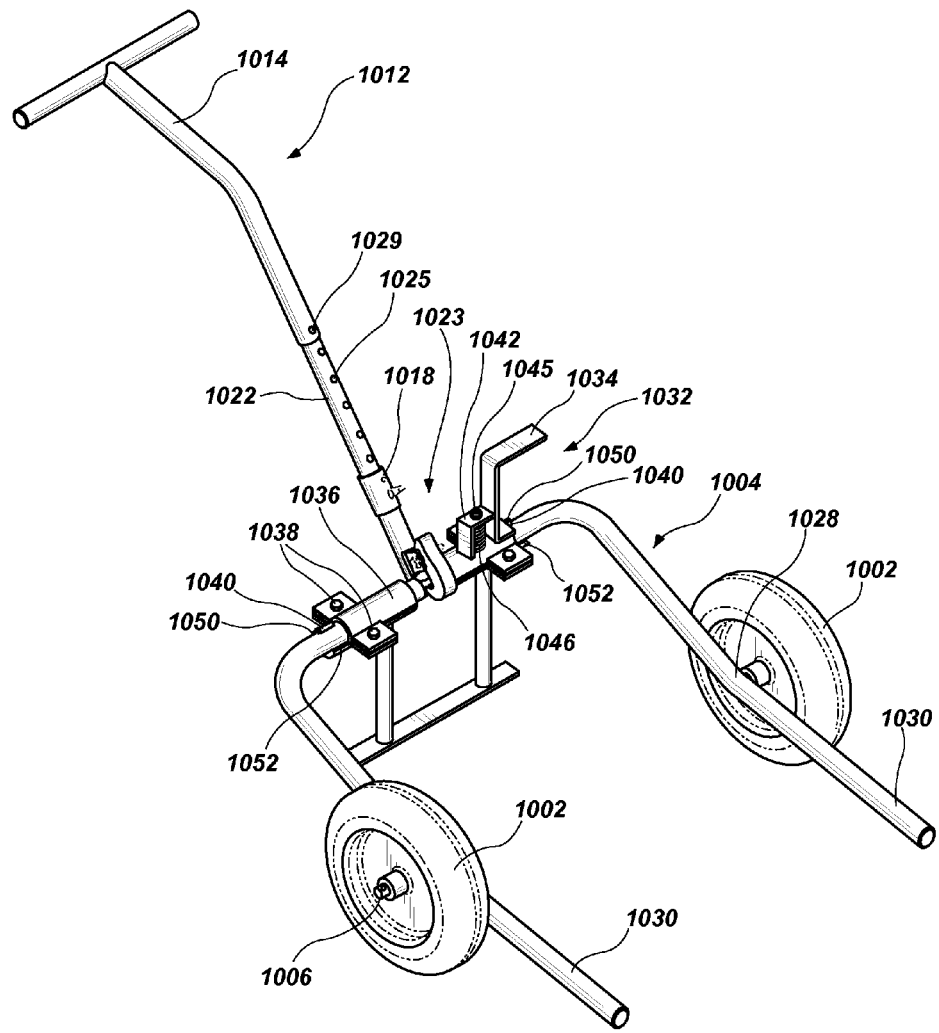
FIG. 63 shows a front elevation perspective view of a transport device cart according to one embodiment of the present invention.
Figure 64:
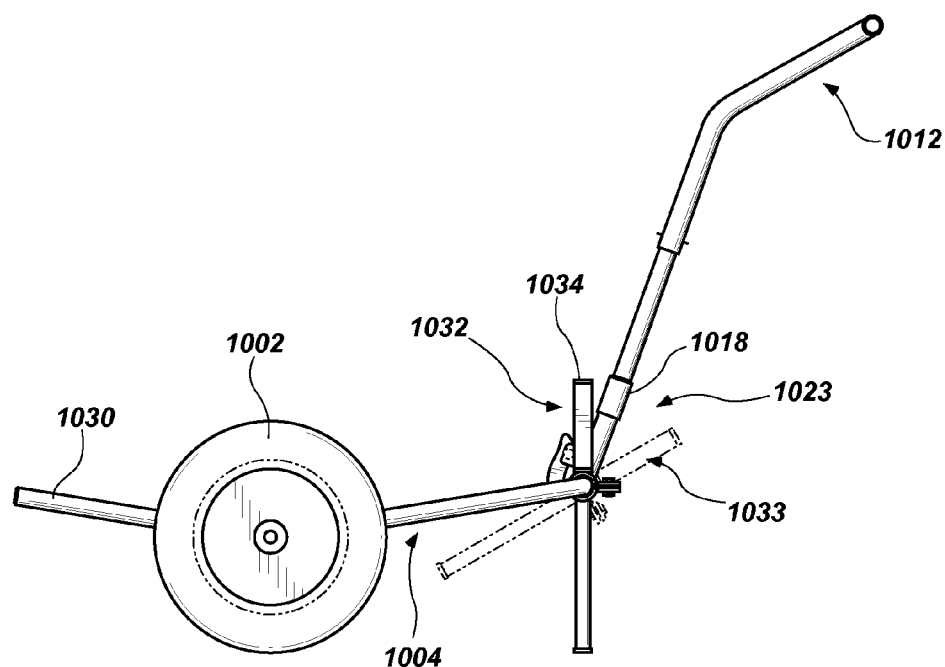
FIG. 64 shows a side view of the cart of FIG. 63.
Figure 65:
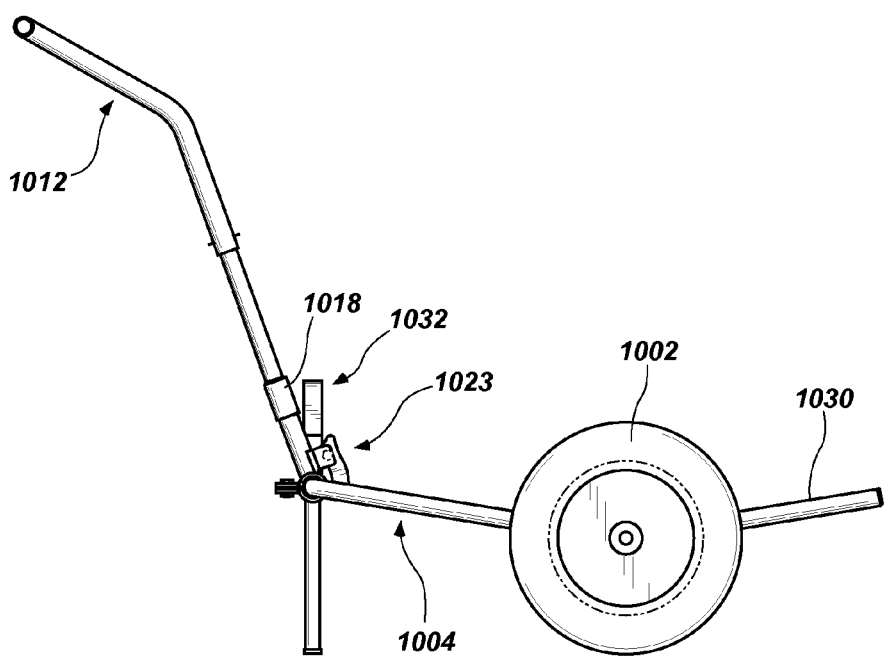
FIG. 65 shows an opposite side view of the cart of FIG. 63.
Figure 66:
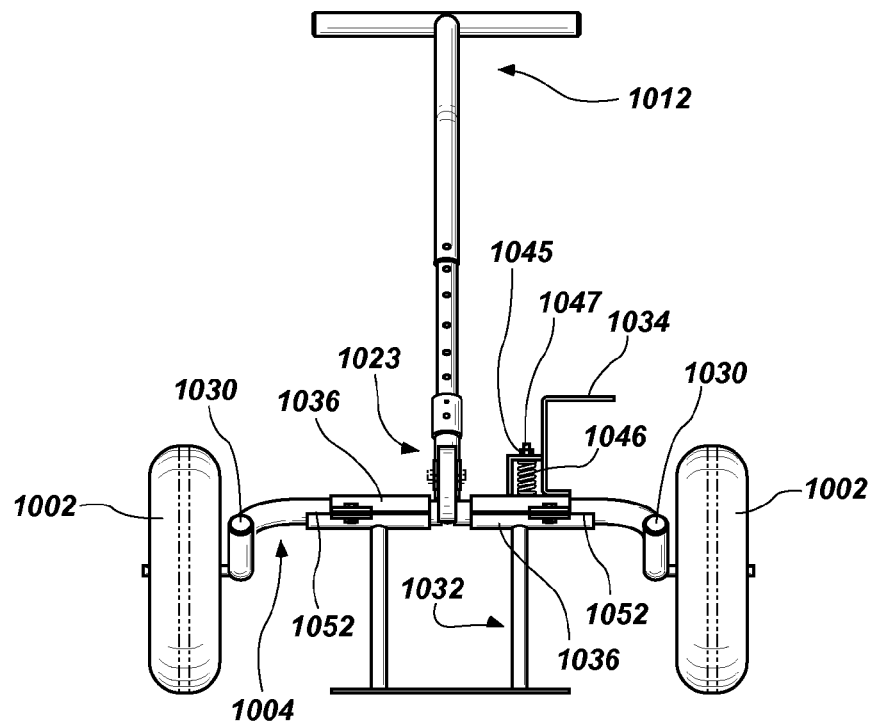
FIG. 66 shows a front view of the cart of FIG. 63.
Figure 67:
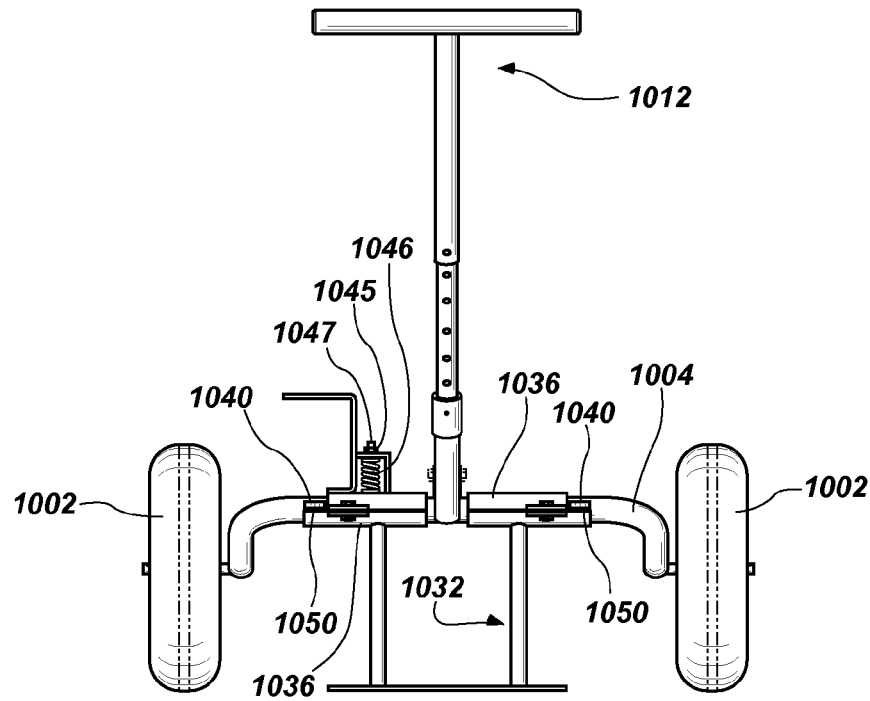
FIG. 67 shows a rear view of the cart of FIG. 63.

Advantageously, the handle portion 714 can be completely collapsed or even removed. Removal of the handle portion 714 allows easier storage and transportation of the device. Certain embodiments of the device allow bucket capacity equal to or greater than standard wheel barrows, but which can be transported in the trunk of an ordinary car. For example, in one embodiment, the wheels are secured to the axle with pin bolts, thus allowing for their easy removal. As such, a user could remove the handle portion and wheels and place them inside the bucket. The profile then becomes so small that the entire device can be easily fit into a relatively small storage space. As seen in FIGS. 55 and 56, the bucket 800 can also be equipped with a lid 814 to secure the items therein.

Frame 704 and handle assembly 712 are, in one embodiment, made of stainless steel tubing, but could be numerous other materials that would be apparent to one skilled in the art including but not limited to iron; aluminum; combinations and alloys thereof; wood; plastics; and fiberglass and combinations thereof. It is also noted that the frame 704 and handle assembly 712 need not necessarily be tubing. In certain embodiments, it may be desirable to have the frame 704 and handle 712 made of a solid material. In other embodiments, it may be advantageous to have the frame 704 and handle 712, or portions thereof, have different cross-sectional shapes (other than substantially circular). As noted in previous embodiments, the frame 704 in this embodiment is bent to substantially 90 degree angles at corners. This could be accomplished with 90 degree joints or bending a single piece.

Referring to FIGS. 57-62, further examples of a frame assembly 904, a handle assembly 912; and a latching assembly 923—collectively a cart—are shown. In the present embodiments, the latching assembly 923 connects to handle assembly 912 at sleeve 918. The cart includes one more rolling mechanisms 902—which in the illustrated embodiment are wheels. The arms 930 can also include one or more catchers 928.

In FIGS. 58-62, a kickstand 932 feature is included with the cart. The kickstand 932 can be made of numerous materials that would be apparent to one skilled in the art including, but not limited to plastics, steel, aluminum and combinations thereof. The kickstand 932 can include a pedal 934 that can be actuated by the hand, foot or knee of the user. In this embodiment, the kickstand 932 is rotatably secured to the frame assembly 904 with sleeve couplers 936 secured by one or more fastening mechanisms such as bolts 938. However, it is noted that in certain embodiments, the sleeve couplers 936 will not be bolted together around the frame assembly 904.

Rather, they could be inserted as a single piece of tubing over the frame assembly 904 prior to the arms 930 being bent to their final orientation.

In this embodiment, a stopper 940 is fastened to the frame assembly 904 through a weld, adhesive or other fastening mechanism that would be apparent to one skilled in the art. The stopper corresponds to a portion of the coupler 936 that has been cut away to create gap 948.

When the kickstand 932 is engaged, one end 950 of the gap 948 abuts against the stopper 940 thus preventing the kickstand 932 from motion beyond a predetermined point. In one embodiment, when the kickstand is disengaged, the opposite end 952 of the gap 948 can similarly abut against the stopper 940 to prevent the kickstand from moving too far in the opposite direction.

The kickstand 932 can include a spring rod mechanism for increased stability. Specifically, the spring rod mechanism can be used to create resistance between the kickstand 932 and the frame assembly 904. In the present embodiment, a rod, such as a bolt 947 (FIGS. 61 and 62) is placed inside a spring 946. The head of the bolt extends downward slightly through a hole (not shown) in the coupler 936 such that the bolt head lightly contacts the underlying frame assembly 904. A spring 946 abuts against the bottom of the bolt head on one end. On the other end, it presses up against a support piece 942—which in the present embodiment is an approximately ninety (90) degree bend adjacent to the pedal 934. The bolt is secured by nut 945.

Thus, the spring 947 presses the bolt head downward through the hole toward the frame assembly 904 and thereby creates resistance to the kickstand's rotational movement and increases its stability.

Referring to FIGS. 63-67, yet another example of a frame assembly 1004, a handle assembly 1012; and a latching assembly 1023—collectively a cart—are shown. The cart can include one or more rolling mechanisms 1002—which in the illustrated embodiment are wheels. The arms 1030 can also include one or more catchers. These embodiments also illustrate a unique handle assembly 1012. In particular, this embodiment includes a handle portion 1014 that corresponds to an adjuster element 1022 that is further coupled to the latching assembly 1023 at sleeve 1018. As discussed previously herein, the handle portion 1014 also includes one or more holes 1029 that correspond to one or more holes 1025 in the adjuster element 1022. Thus, handle portion 1014 can be telescopically slid over the adjuster element 1022 depending on the desired height of the handle assembly 1012.

The kickstand 1032 includes a pedal 1034 that can be actuated by the hand, foot or knee of the user. The kickstand 1032 is rotatably secured to the frame assembly 1004 with sleeve couplers 1036 secured by one or more fastening mechanisms such as bolts 1038. In certain embodiments, the sleeve couplers 1036 will not be bolted together around the frame assembly 1004. Rather, they can be inserted as a single piece of tubing over the frame assembly 1004 prior to the arms 1030 being bent to their final orientation.

A stopper 1040 is fastened to the frame assembly 1004 through a weld, adhesive or other fastening mechanism that would be apparent to one skilled in the art. The stopper 1040 corresponds to a portion of the coupler 1036 that has been cut away to create a gap. When the kickstand 1032 is engaged, one end 1050 of the gap 1048 abuts against the stopper 1040 thus preventing the kickstand 1032 from motion beyond a predetermined point. In one embodiment, when the kickstand is disengaged, the opposite end 1052 of the gap 1048 can similarly abut against the stopper 1040 to prevent the kickstand from moving too far in the opposite direction.

The kickstand 1032 can include a spring rod mechanism for increased stability. Specifically, the spring rod mechanism can be used to create resistance between the kickstand 1032 and the frame assembly 1004. In the present embodiment, a rod, such as a bolt 1047 (FIGS. 66 and 67) is placed inside a spring 1046. The head of the bolt extends downward slightly through a hole (not shown) in the coupler 1036 such that the bolt head lightly contacts the underlying frame assembly 1004. The spring 1046 abuts against the bottom of the bolt head on one end. On the other end, it presses up against a support piece 1042—which in the present embodiment is an approximately ninety (90) degree bend adjacent to the pedal 1034. The bolt is secured by nut 1045. Thus, the spring 1047 presses the bolt head downward through the hole toward the frame assembly 1004 and thereby creates resistance to the kickstand's rotational movement and increases its stability.

In this embodiment, arms 1030 have bends 1028 proximate the axles 1006 to which wheels 1002 are secured. However, in other embodiments, the bends 1028 could be at other locations on the arms 1030. These bends 1028 correspond to tracks on the removable bucket.

Method of Operation

For purposes of better understanding the present invention, illustrative examples are provided. They are in no way intended to limit the scope of the present invention as defined in the claims.

Figure 2:
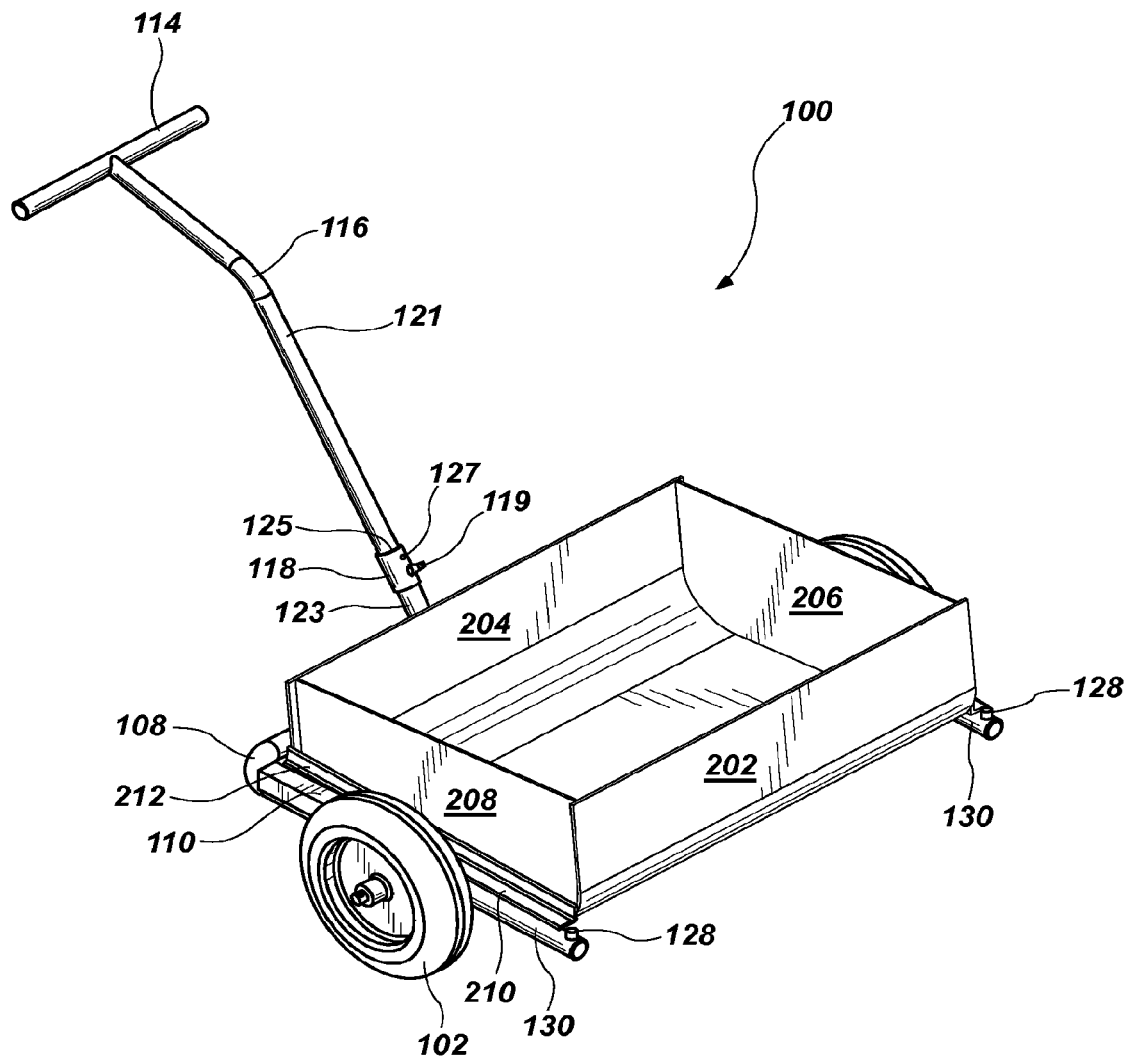
FIG. 2 shows a front elevation view of a transport device with the bucket attached according to one embodiment of the present invention.

Referring to FIGS. 1-2, before engaging the bucket 200 on the frame 104—whether full or empty—its positioning may be less than ideal. As such, the arms 130 can be tilted downward and the catchers 128 can be placed under the notches 214. The handle assembly 112 can then be pushed down and the catchers 128 will rise up into and engage the notches 214. The bucket 200, once so engaged, can then be dragged out to a more desirable location.

Once the bucket 200 is placed where desired, a user would then disengage the catchers 128 from the notches 214 and slide arms 130 underneath tracks 210. The weight of the bucket 200—especially when filled—helps keep bucket 200 in place while the user pushes the handle assembly 112 in a substantially forward direction. The handle assembly 112 can then be pushed in a substantially downward direction. This will raise the bucket 200 off the ground and as the handle assembly 112 is pushed farther downward, the bucket 200 will slide fully into place and can then be transported where desired.

Referring now to FIGS. 32-37, the movement and emptying of a transport device 300, according to one embodiment of the present invention, is shown. This transport device 300 includes wheels 302 attached to a frame 304 at axes 306. The frame 304 includes guide pieces 310 on each of the arms 330 that direct the placement of the bucket 400 and help secure track 410. It is noted that in this case, the arms 330 extend beyond the front edge of bucket 400. This configuration allows the arms 330 to absorb some of the weight of the bucket contents when dumping—which helps preserve the integrity of the bucket 400. However, in other embodiments, it may be desirable to have shorter arms 330.

Figure 33:
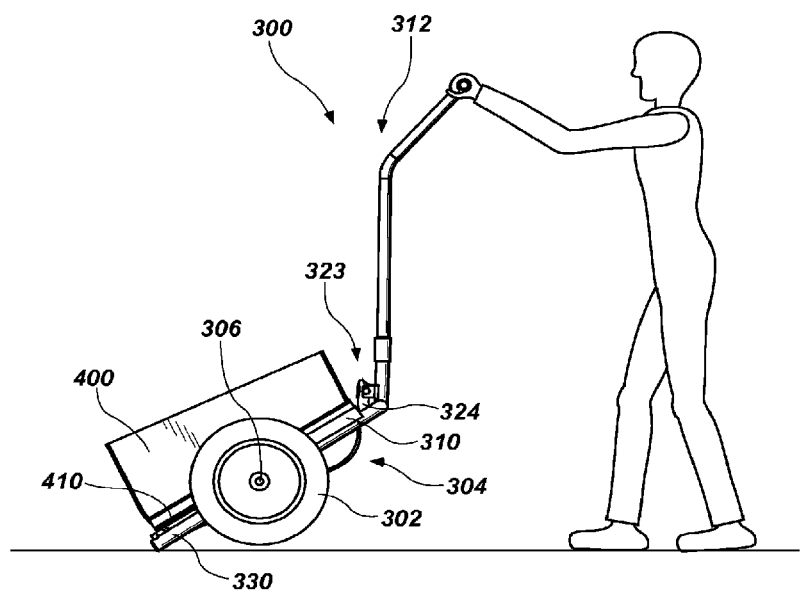
FIG. 33 is a side view showing a user tipping a transport device according to one embodiment of the present invention.
Figure 34:
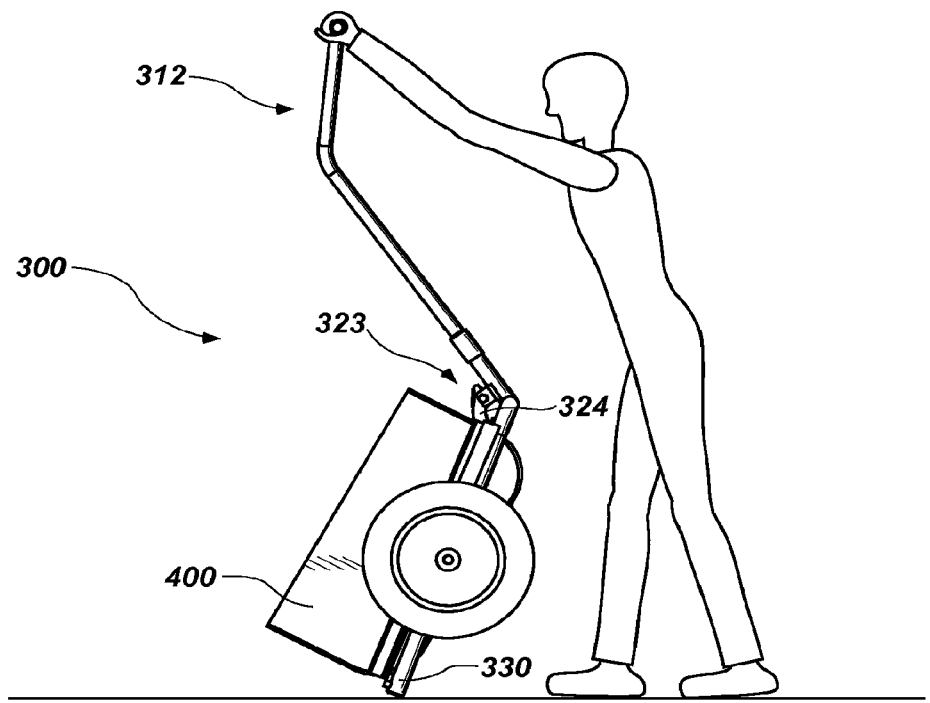
FIG. 34 is a side view showing a user at one stage of dumping a transport device according to one embodiment of the present invention.
Figure 35:
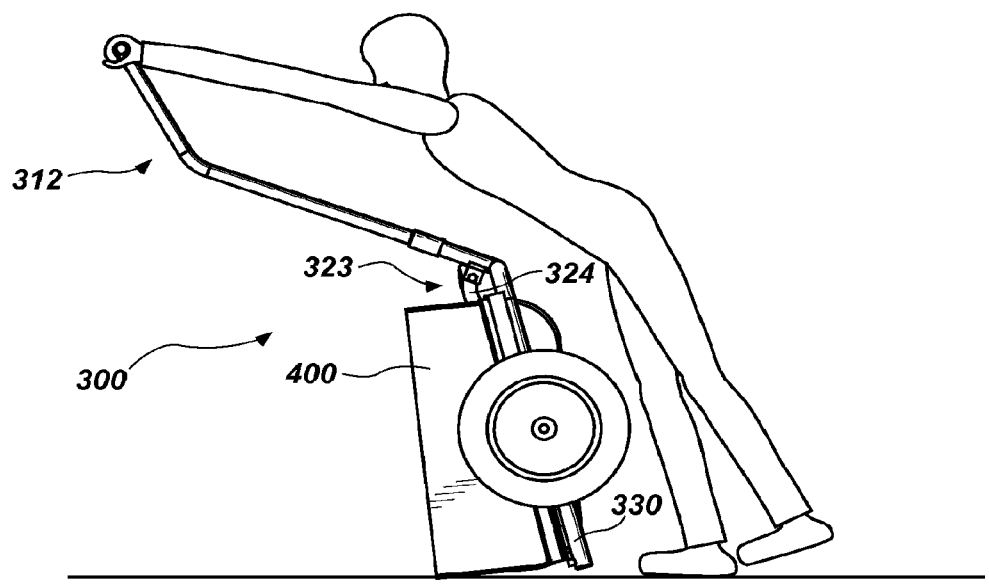
FIG. 35 is a side view showing a user at another stage of dumping a transport device according to one embodiment of the present invention.

The user would push the handle assembly 312 which forward motion would move the bucket 400 and its contents to the desired location. As seen in FIGS. 33-34, once at the desired location, the user would push the handle assembly 312 in a forward and upward direction. The arms 330 create frictional resistance with the surface on which the bucket 400 is being dumped and the user pushing on the handle assembly 312 tips the bucket 400. As depicted in FIG. 35, once the bucket 400 has been pushed into a substantially upright position, the hooking latch 324 of the latching assembly 323 disengages from latching post 352 (FIGS. 36-37). As depicted in FIGS. 36-37, the handle assembly 312 can then be rotated back and used to push the bucket 400 into a substantially inverted position. It is noted that the hooking latch 324 is typically substantially free hanging. Thus, the depiction in FIG. 37 is for illustrative purposes to signify that the hook 324 has detached from post 352.

Figure 39:
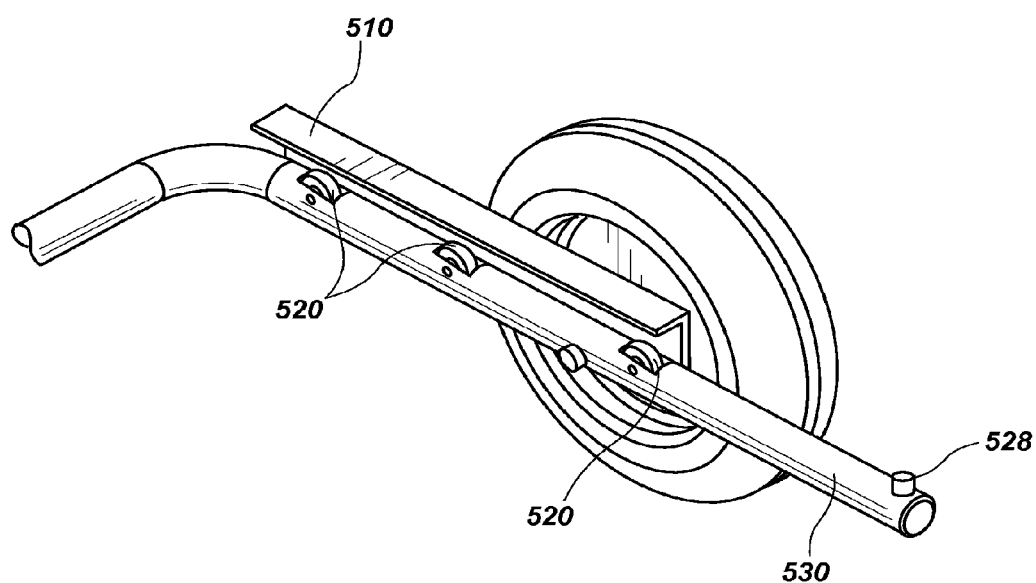
FIG. 39 is a front elevation view of an arm and wheel according to one embodiment of the present invention.

In certain embodiments, friction reduction features can be added to the transport device to facilitate sliding the bucket onto the conveyance mechanism. For example, as seen in FIG. 39, wheels 520 can be added to arms 530. In this embodiment, three wheels 520 are placed just below guide rail 510. Thus, when a bucket is slid onto the arms 530, the wheels 520 allow for a much smoother engagement between the arms 530 and the track. It is noted that in some embodiments, more or fewer wheels may be desirable. In other embodiments, the placement of the wheels can be altered. For example, in one embodiment, there is a single wheel substantially at the end of each arm. In yet other embodiments, the friction reduction feature could be on the bucket track. Other friction reduction features would be apparent to one skilled in the art including, but not limited to, ball bearings; lubricants; graphite or other carbon coatings.

Referring to the embodiments in FIGS. 47-56, a user would slide arms 730 underneath tracks 810 and push the handle assembly 712 in a substantially downward direction. This raises the bucket 800 off the ground and as the handle assembly 712 is pushed downward, the bucket 800 slides until the v-shaped overhang 809 engages the bends 728 in arms 730. The bucket 800 can then be transported where desired and dumped in a manner similar to that described in connection with the other embodiments discussed above.

It is understood that the above-described arrangements are only illustrative of the application of the basic principles of the present invention. Numerous modifications and alternative arrangements may be devised by those skilled in the art without departing from the spirit and scope of the present invention. The appended claims are intended to cover such modifications and arrangements.

For example, base pieces 136, 138 as discussed above, are shown to be substantially tubular. On the inside of pieces 136, 138, this is advantageous so the base pieces 136, 138 can rotate around back bar 133 of frame 104. However, the exterior of the base pieces 136, 138 could be numerous other shapes in cross section including but not limited to substantially square; substantially pentagonal; substantially hexagonal; etc.

It is also noted that in certain embodiments described above, base pieces 136, 138 and connection piece 140 are three separate pieces connected together with a weld, adhesive, mechanical means or other connection mechanism that would be apparent to one skilled in the art. However, in other embodiments, this feature could be single molded piece.

In the above-described embodiments, the back bar 133 includes a smaller diameter piece of frame 132—this is the axis along which latch piece 123 (as well as handle assembly 112 when engaged) rotates. This is advantageous as it keeps the latch piece 123 in substantially the same lateral position. However, it is noted that in some instances, it may be desirable to have the frame, or at least the back bar piece 133 be of substantially uniform in diameter or even other variations in diameter. The latch piece could easily be adjusted to accommodate such diameters and could be held in place by a variety of mechanisms that would be apparent to one skilled in the art.

The invention claimed is:

1. A transport device cart comprising:
   a) frame assembly having one or more arms corresponding to and capable of engaging a removable bucket; one or more movement mechanisms; and a latching post;
   b) a latching assembly rotatably coupled to the frame assembly having a hooking latch capable of engaging and disengaging the latching post; and
   c) a handle assembly coupled to the latching assembly, wherein the handle assembly can be rotated back and used to push the removable bucket into a substantially inverted position; and
   d) a kickstand having a stopping mechanism that prevents the kickstand from motion beyond a predetermined point and wherein the stopping mechanism further comprises a stopper fastened to the frame assembly; and one or more ends of a gap in the sleeve, wherein the ends of the gap but up against the stopper thus preventing the kickstand from motion beyond a predetermined point.

2. The transport device cart of claim 1, wherein the latch assembly further comprises two base pieces connected at substantially 90 degree angles to a connection piece.

3. The transport device cart of claim 2, wherein the latch assembly further comprises a u-shaped fastener secured to the connection piece.

4. The transport device cart of claim 3, wherein the latch assembly further comprises a hook latch rotatably coupled to the fastener.

5. The transport device cart of claim 4, wherein the hook latch is two or more hook pieces connected substantially parallel to one another and separated by a spacer.

6. The transport device cart of claim 5, wherein the hook latch includes a threaded receptacle between the hook pieces.

7. The transport device cart of claim 4, wherein the hook latch is a substantially single piece.

8. The transport device cart of claim 1 wherein the handle assembly is removable.

9. The transport device cart of claim 1, wherein the handle assembly includes a locking pivot mechanism.

10. The transport device cart of claim 9, wherein the handle assembly and the latch assembly are coupled at a sleeve thereby allowing the handle assembly to pivot in a variety of orientations such that the transport device cart can be easily moved in a relatively small space.

11. The transport device cart of claim 1, wherein the hook latch is capable of disengaging the latching post when the bucket is being emptied such that the bucket can be tipped until substantially upside down.

12. The transport device cart of claim 1, wherein the kickstand includes a pedal.

13. The transport device cart of claim 1, wherein the kickstand is coupled to the frame assembly with one or more sleeves.

14. The transport device cart of claim 1, further comprising a spring rod mechanism.

15. The transport device cart of claim 1 wherein the one or more arms are bent.

* * * * *